United States Patent
Park et al.

(10) Patent No.: US 8,593,114 B2
(45) Date of Patent: Nov. 26, 2013

(54) CONTROL DEVICE FOR DOUBLY-FED INDUCTION GENERATOR IN WHICH FEEDBACK LINEARIZATION METHOD IS EMBEDDED

(75) Inventors: Jung Woo Park, Gyeongsangnam-do (KR); Dae Wook Kang, Gyeongsangnam-do (KR); Ji Woo Moon, Busan (KR); Jin Soo Kwon, Gyeongsangnam-do (KR); Deuk Woo Pae, Gyeongsangnam-do (KR); Chang Hun Oh, Gyeongsangnam-do (KR)

(73) Assignee: Korea Electrotechnology Research Institute, Gyeongsangnam-do (KR)

( * ) Notice: Subject to any disclaimer, the term of this patent is extended or adjusted under 35 U.S.C. 154(b) by 511 days.

(21) Appl. No.: 12/979,030

(22) Filed: Dec. 27, 2010

(65) Prior Publication Data

US 2012/0112708 A1    May 10, 2012

(30) Foreign Application Priority Data

Nov. 4, 2010    (KR) .......................... 10-2010-0109140

(51) Int. Cl.
*H02P 9/00*    (2006.01)

(52) U.S. Cl.
USPC ............................................... 322/24; 322/20

(58) Field of Classification Search
USPC ................................ 322/22, 23, 24, 20, 36, 37
See application file for complete search history.

(56) References Cited

U.S. PATENT DOCUMENTS

| | | | |
|---|---|---|---|
| 7,518,256 B2* | 4/2009 | Juanarena Saragueta et al. | 290/44 |
| 7,638,983 B2* | 12/2009 | Park et al. | 322/20 |
| 7,800,243 B2* | 9/2010 | Bendixen et al. | 290/44 |
| 7,830,127 B2* | 11/2010 | Corcelles Pereira et al. | 322/24 |
| 7,919,879 B2* | 4/2011 | Flannery et al. | 290/44 |
| 8,395,360 B2* | 3/2013 | Tripathi et al. | 322/29 |
| 8,400,003 B2* | 3/2013 | Letas et al. | 290/44 |
| 8,476,871 B2* | 7/2013 | Ooi et al. | 322/24 |
| 2004/0145188 A1* | 7/2004 | Janssen et al. | 290/44 |
| 2007/0052244 A1* | 3/2007 | Hudson | 290/44 |
| 2010/0117606 A1* | 5/2010 | Oohara et al. | 322/28 |
| 2010/0142237 A1* | 6/2010 | Yuan et al. | 363/97 |
| 2012/0056602 A1* | 3/2012 | Li et al. | 322/89 |

FOREIGN PATENT DOCUMENTS

KR    10-2010-0054231 A    5/2010

OTHER PUBLICATIONS

Jang, Jeong-Ik et al.: "Nonlinear Control of Output Voltages of PWM Inverters for Stand-Alone Wind Power Generation", in Korean with English translation of Abstract, *PWM*, vol. 12, No. 2, 2007, pp. 131-138.

* cited by examiner

*Primary Examiner* — Nicholas Ponomarenko
(74) *Attorney, Agent, or Firm* — Frommer Lawrence & Haug LLP; Ronald R. Santucci

(57) ABSTRACT

The present invention relates to a control device for a doubly-fed induction generator in which a feedback linearization method is enabled and further provides a control device for a doubly-fed induction generator in which a feedback linearization method is embedded, characterized in that the control device divides and measures positive sequency components and negative sequency components from stator voltage and current, rotor voltage and current, and signals of stator magnetic flux and rotor magnetic flux of the doubly-fed induction generator.

19 Claims, 18 Drawing Sheets

(a)

(b)

(c)

(a)

(b)

(c)

CONTROL DEVICE FOR DOUBLY-FED INDUCTION GENERATOR IN WHICH FEEDBACK LINEARIZATION METHOD IS EMBEDDED

CROSS-REFERENCE TO RELATED APPLICATION

This application claims under 35 U.S.C. §119(a) the benefit of Korean Patent Application No. 10-2010-0109140 filed on Nov. 4, 2010, the entire contents of which are incorporated herein by reference.

BACKGROUND

1. Technical Field

The present invention relates to a control device for a doubly-fed induction generator in which a feedback linearization method is enabled, in more detail, a control device for a doubly-fed induction generator which can implement an LVRT (Low Voltage Ride-Through) function by improving a DC link voltage control performance and an output control performance even under unbalanced voltage, such as a momentary power failure, by controlling a positive sequency component and a negative sequency component, which have non-linear characteristics, to be linearized while controlling the positive sequency component and the negative sequency component of the current of a rotor in a doubly-fed induction generator, respectively, for a d-axis and a q-axis.

2. Background Art

Doubly-fed induction generators are typical generators used for wind power generation and researches have been conducted to apply the generators to the tidal current power generation, the tidal power generation, and the wave power generation, etc.

In general, a grid-connected power generation system designed to generate electricity in connection to an electric power system is in close connection with system voltage, and particularly, it has known that a power generation system using a DFIG (Doubly-fed induction generator) is considerably influenced by characteristics of the system voltage, because it has a structure in which three-phase power line is directly connected to the wire of a stator in the doubly-fed induction generator. Therefore, technical development has been continued for control devices that keep generating power under changes in system voltage.

FIG. 1 illustrates a control device for a doubly-fed induction generator equipped with an AC-DC-AC conversion device having a back-to-back structure using an IGBT in the related art. The device can be divided into a generator-side converter attached to the wire of a rotor of the doubly-fed induction generator (DFIG) and a system-side converter connected with a power system line passing a transformer.

FIG. 2 illustrates a control method of the control device for a doubly-fed induction generator illustrated in FIG. 1. The control device acquires and uses information for control by measuring current and voltage at each terminal and then converting them in a d-q coordinate system, and particularly, performs the control, using the current component flowing through the wire of the rotor of the doubly-fed induction generator.

However, the control device of the related art represents good control characteristics when the system voltage maintains three-phase balance, but the control characteristics are deteriorated under unbalanced voltage. FIG. 3 illustrates an example when system voltage drops and FIG. 4 illustrates active power characteristics in the section where the system voltage drops.

In detail, a yellow signal ch1 indicates a detection signal for 30% drop of the system voltage, a red signal ch2 indicates DC-link (DC_link) voltage, a green signal ch4 indicates non-filtered active power, and a blue signal ch3 indicates filtered active power, in FIG. 4. Further, FIG. 5 illustrates control characteristics (FIG. 5A) of DC-link voltage under 50% system voltage drop (FIG. 5C) and active power control characteristics (FIG. 5B) of the doubly-fed induction generator.

As illustrated in the figures, it can be seen that the control device according to the related art stably performs control under system voltage within a normal range, but the control is performed, with active power including a lot of harmonics in the section where the voltage drops, and control characteristics are not maintained under momentary drop of the system voltage.

Since the system becomes unstable when the DC-link (DC_link) voltage cannot be constantly controlled under the three-phase unbalanced voltage, power generation cannot be continued and reactive power cannot be supplied in the unbalanced voltage section.

It is necessary to stop the power generation equipment in order to protect the control device for the generator, when it fails to control the doubly-fed induction generator in order to keep the DC-link voltage in a stable range under system voltage drop or momentary power failure. In this case, since it is required to observe the regulation that prohibits restart at least within five minutes when the power generation equipment stops, the operation factor decreases and the power amount reduces while it is impossible to prevent the amount of energy, which is supplied to the power system, from fluctuating widely.

This case results in the same effect as a sudden change of load, which imposes a burden on the power producer who manages the electrical power grid. A technical specification is applied to keep generating power when the system voltage regulation is within 10% in the related art; however, it is recently required to expand the technical standard to keep generating power even under system voltage drop and momentary power failure for a short time.

That is, although the LVRT (Low Voltage Ride-Through) function that keeps the operation even under short system disturbance has been considered as a necessary specification in the Grid Code, there is a problem that it is impossible to perform the LVRT function, when it is impossible to control the DC-link voltage at a constant level under unstable system voltage, such as in momentary power failure, as described above.

Therefore, the present invention has been made in an effort to solve the problems and it is an object of the present invention to provide a control device that can stably control a doubly-fed induction generator even in a three-phase unbalanced section, such as momentary failure, as well as a section where system voltage maintains three-phase balance.

Especially, it is an object of the present invention to provide a control device for a doubly-fed induction generator which can implement an LVRT (Low Voltage Ride-Through) function by improving a DC link voltage control performance and an output control performance even under unbalanced voltage, such as a momentary power failure, by controlling a positive sequency component and a negative sequency components, which have non-linear characteristics, to be linearized while controlling the positive sequency component and the negative sequency component of the current of a rotor in a doubly-fed induction generator, respectively, for a d-axis and a q-axis.

SUMMARY OF THE DISCLOSURE

In order to achieve the objects, an embodiment of the present invention provides a control device for a doubly-fed induction generator in which a feedback linearization method is embedded, in which the doubly-fed induction generator is controlled by a power conversion device composed of a system-side converter having an AC-DC conversion function and a generator-side converter having a DC-AC conversion function. The control device divides and measures positive sequency components and negative sequency components from stator voltage and current, rotor voltage and current, and signals of stator magnetic flux and rotor magnetic flux of the doubly-fed induction generator, divides the rotor current into four signals by dividing d-axial current and q-axial current from the positive sequency component and the negative sequency component of the rotor current, and makes a positive sequency component controller and a negative sequency component controller for the rotor current separately control the four signals of the rotor current, using the measured value, in which the positive sequency component controller and the negative sequency controller perform current input-output control, which is linearized by a feedback linearization method, for the d-axial current and the q-axial current respectively.

In order to achieve the objects, another embodiment of the present invention provides a control device for a doubly-fed induction generator in which a feedback linearization method is embedded, in which the doubly-fed induction generator is controlled by a power conversion device composed of a system-side converter having an AC-DC conversion function and a generator-side converter having a DC-AC conversion function. The control device divides and measures positive sequency components and negative sequency components from stator voltage and current, rotor voltage and current, and signals of stator magnetic flux and rotor magnetic flux of the doubly-fed induction generator, divides the rotor current into four signals by dividing d-axial current and q-axial current from the positive sequency component and the negative sequency component of the rotor current, and makes a positive sequency component controller and a negative sequency component controller for the rotor current separately control the four signals of the rotor current, using the measured value, in which the positive sequency component controller performs current input-output control, which is linearized by a feedback linearization method, for the d-axial current and the q-axial current.

In this case, d-axial output $v_{rd}^p$ of the positive sequency component controller is calculated as $$v_{rd}^p = \{(R_r i_{rd}^p) - (\omega_s - \omega_r)(\sigma L_r) i_{rq}^p\} + (\sigma L_r) v_1^p$$

Also, q-axial output $v_{rq}^p$ of the positive sequency component controller is calculated as $$v_{rq}^p = \left\{(R_r i_{rq}^p) + (\omega_s - \omega_r)\frac{L_m^2}{L_s}(i_{ms}^p) + (\omega_s - \omega_r)(\sigma L_r) i_{rd}^p\right\} + (\sigma L_r) v_2^p$$

Also, a new state variable $v_1^p$ is $y_1^* = i_{rd}^{p*}$, and when $y_1 = i_{rd}^p$, it is calculated as $$v_1^p = \lambda_{11} e_1^p + \lambda_{12} \int e_1^p dt = \lambda_{11}(y_1^* - y_1) + \lambda_{12} \int (y_1^* - y_1) dt$$

Or, the new state variable $v_1^p$ is $y_1^* = i_{rd}^{p*}$, and when $y_1 = i_{rd}^p$, it is calculated as $$v_1^p = \dot{y}_1^* + \lambda_{11} e_1^p + \lambda_{12} \int e_1^p dt = \dot{y}_1^* + \lambda_{11}(y_1^* - y_1) + \lambda_{12} \int (y_1^* - y_1) dt$$

Also, the new state variable $v_2^p$ is $y_2^* = i_{rq}^{p*}$, and when $y_2 = i_{rq}^p$, it is calculated as $$v_2^p = \lambda_{21} e_2^p + \lambda_{22} \int e_2^p dt = \lambda_{21}(y_2^* - y_2) + \lambda_{22} \int (y_2^* - y_2) dt$$

Or, the new state variable $v_2^p$ is $y_2^* = i_{rq}^{p*}$, when $y_2 = i_{rq}^p$, is calculated as $$v_2^p = \dot{y}_2^* + \lambda_{22} \int e_2^p dt = \dot{y}_2^* + \lambda_{21}(y_2^* - y_2) + \lambda_{22} \int (y_2^* - y_2) dt$$

In an embodiment of the present invention, d-axial output $v_{rd}^n$ of the negative sequency component controller is calculated as $$v_{rd}^n = \{(R_r i_{rd}^n) - (-\omega_s - \omega_r)(\sigma L_r) i_{rq}^n\} + (\sigma L_r) v_1^n$$

Also, q-axial output $v_{rq}^n$ of the negative sequency component controller is calculated as $$v_{rq}^n = \left\{(R_r i_{rq}^n) + (-\omega_s - \omega_r)\frac{L_m^2}{L_s}(i_{ms}^n) + (-\omega_s - \omega_r)(\sigma L_r) i_{rd}^n\right\} + (\sigma L_r) v_2^n$$

In this case, the new state variable $v_1^n$ is $y_1^* = i_{rd}^{n*}$, when $y_1 = i_{rd}^n$, it is calculated as $$v_1^n = \lambda_{11} e_1^n + \lambda_{12} \int e_1^n dt = \lambda_{11}(y_1^* - y_1) + \lambda_{12} \int (y_1^* - y_1) dt$$

Or, the new state variable $v_1^n$ is $y_1^* = i_{rd}^{n*}$, and when $y_1 = i_{rd}^n$, it is calculated as $$v_1^n = \dot{y}_1^* + \lambda_{11} e_1^n + \lambda_{12} \int e_1^n dt = \dot{y}_1^* + \lambda_{11}(y_1^* - y_1) + \lambda_{12} \int (y_1^* - y_1) dt$$

Or, the new state variable $v_2^n$ is $y_2^* = i_{rq}^{n*}$, and when $y_2 = i_{rq}^n$, is calculated as $$v_2^n = \lambda_{21} e_2^n + \lambda_{22} \int e_2^n dt = \lambda_{21}(y_2^* - y_2) + \lambda_{22} \int (y_2^* - y_2) dt$$

Or, the new state variable $v_2^n$ is $y_2^* = i_{rq}^{n*}$, and when $y_2 = i_{rq}^n$, it is calculated as $$v_2^n = \dot{y}_2^* + \lambda_{21} e_2^n + \lambda_{22} \int e_2^n dt = \dot{y}_2^* + \lambda_{21}(y_2^* - y_2) + \lambda_{22} \int (y_2^* - y_2) dt$$

Also, it is preferable that d-axial rotor current reference value ($i_{rd}^{n*}$) and q-axial rotor current reference value ($i_{rq}^{n*}$) of the negative sequency component used in the negative sequency component controller is set as $i_{rd}^{n*} = 0$ and $i_{rq}^{n*} = 0$, respectively.

According to the embodiment of the present invention, the control device performs sequence control such that a stator-side main switch is turned on, when the magnitude of the system voltage positive sequency component is more than 90% of the rated voltage of the positive sequency component, and the DC-link voltage is between the upper limit and the lower limit of the DC-link voltage.

Further, the control device performs sequence control such that a stator-side main switch is turned off, when the magnitude of the system voltage positive sequency component is less than 90% of the rated voltage of the positive sequency component.

The control device further includes brake resistance devices attached in parallel to both ends of a DC-link voltage and performs the sequence control such that the brake resistance devices are turned on when the DC-link voltage is larger than an upper limit of the DC-link voltage, while the brake resistance devices are turned off when the DC-link voltage is between the upper limit of the DC-link voltage and a lower limit of the DC-link voltage.

Further, the control device performs the sequence control such that the power conversion device stops, when the DC-link voltage is larger than an allowable internal pressure (DC-link voltage stop value) considering capacitors attached in parallel to both ends of the DC-link voltage.

According to a control device for a doubly-fed induction generator in which a feedback linearization method is embedded, it is possible to stably control the active power and the DC-link voltage of the doubly-fed induction generator, even under unbalanced voltage in which the system voltage largely fluctuates or momentary power failure (150 ms or less) occurs, when a power generation system equipped with the doubly-fed induction generator (wind power generation, tidal current power generation, and the wave power generation) operates in a grid-connected type.

As described above, according to the present invention, since it is possible to perform stable control even under a section with a system failure, such as momentary power failure, it is not necessary to stop the power conversion device and it is possible to implement an LVRT (Low Voltage Ride-Through) function under Europe standard (E.ON Netz Standard) that prescribes that the operation should be continued without stopping, even in a momentary power failure section, thereby extending a market.

DETAILED DESCRIPTION

Figure 1:
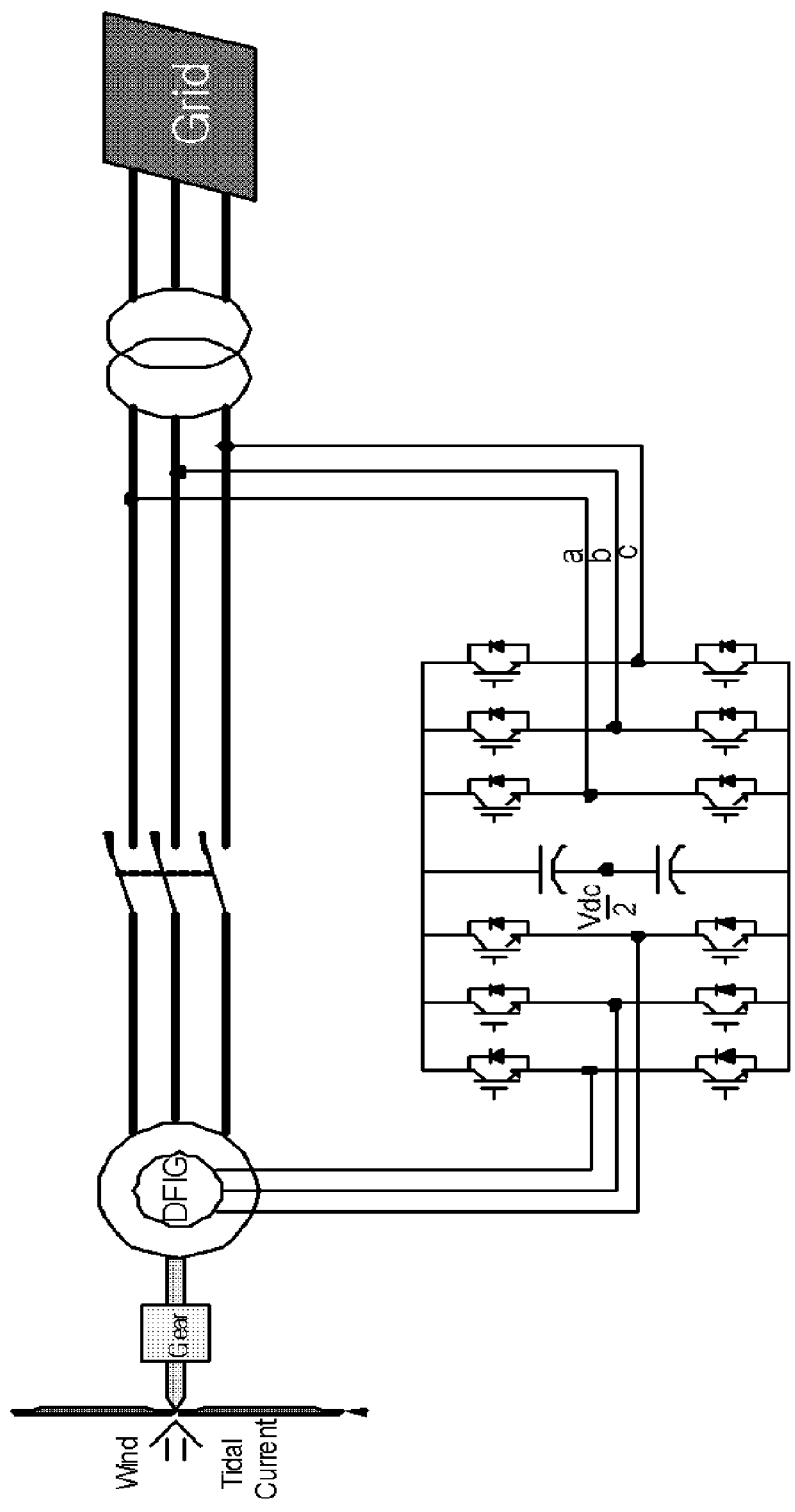
FIG. 1 is a constitutional view illustrating a control method of a doubly-fed induction generator with a back-to-back structure in the related art.
Figure 2:
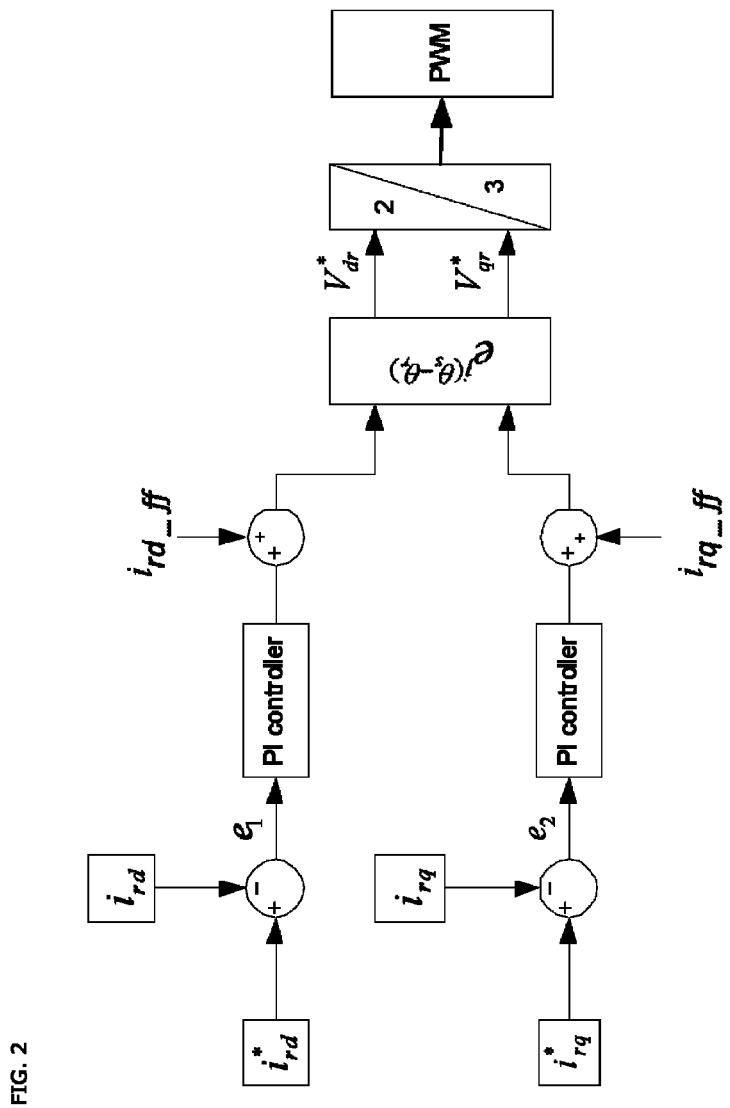
FIG. 2 is a view illustrating a control method of a doubly-fed induction generator according to the related art.
Figure 3:
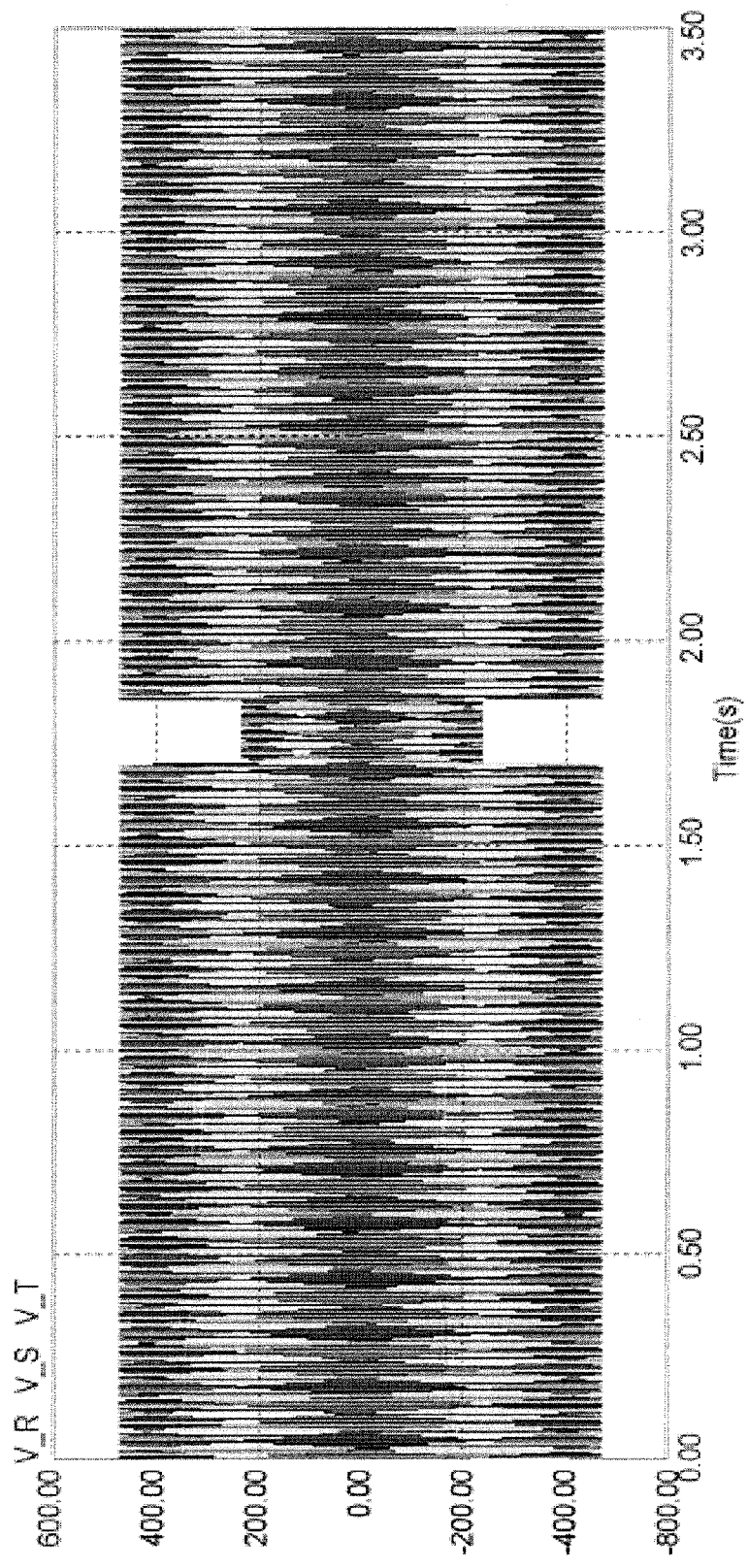
FIG. 3 is a view illustrating the occurrence of system voltage drop.

Hereinafter, preferred embodiments of the present invention are described in detail with reference to the accompanying drawings in order for those skilled in the art to easily understand.

A control device for a doubly-fed induction generator according to the present invention divides positive sequency components and negative sequency components from stator-side voltage and current, rotor-side voltage and current, and signals of stator magnetic flux and rotor magnetic flux of the doubly-fed induction generator (DFIG), converts the components in a d-q coordinate system, and controls the d-axial and the q-axial current components of the positive sequency components and controls the d-axial and the q-axial current components of the negative sequency component by using four signals for the rotor current which is divided into a d-axial positive sequency component, a q-axial positive sequency component, a d-axial negative sequency component, and a q-axial negative sequency component.

In particular, complete decoupling control can be achieved by applying a feedback linearization method to the positive sequency component and the negative sequency component of the rotor current. Therefore, the present invention allows the doubly-fed induction generator having a rotor wire controlling energy flow of a stator wire, which is the main path of energy transfer, to rapidly stabilize system voltage under unbalanced voltage by controlling a rotor-side converter (RSC) of the generator and to have an LVRT function by keeping the DC link voltage within a stable range.

In order to explain the control method of the doubly-fed induction generator according to the present invention, the parameters are defined as follows.

$R_s$, $R_r$: stator resistance, rotor resistance $V_s$, $V_r$: stator voltage, rotor voltage including all the d-axial and q-axial components $V_s^n$, $V_r^n$: stator voltage of negative sequency component, rotor voltage of negative sequency component $V_{rd}^p$, $V_{rq}^p$: d-axial component, q-axial component about positive sequency component of rotor voltage $V_{rd}^n$, $V_{rq}^n$: d-axial component, q-axial component about negative sequency component of rotor voltage $i_s$, $i_r$: stator current, rotor current including all the d-axial and q-axial components $i_s^n$, $i_r^n$: stator current of negative sequency component, rotor current of negative sequency component $i_{rd}^p$, $i_{rq}^p$: d-axial component, q-axial component about positive sequency component of rotor current $i_{rd}{}^n$, $i_{rq}{}^n$: d-axial component, q-axial component about negative sequency component of rotor current $i_{rd}{}^{p*}$, $i_{rq}{}^{p*}$: d-axial reference value, q-axial reference value about positive sequency component of rotor current $i_{rd}{}^{n*}$, $i_{rq}{}^{n*}$: d-axial reference value, q-axial reference value about negative sequency component of rotor current $i_{ms}{}^p$: positive sequency component magnetizing current $i_{ms}{}^n$: negative sequency component magnetizing current $\phi_s$, $\phi_r$: stator magnetic flux inter-linkage, rotor magnetic flux inter-linkage including all the d-axial and q-axial component $\phi_s{}^n$, $\phi_r{}^n$: negative sequency component of stator magnetic flux inter-linkage, negative sequency component of rotor magnetic flux inter-linkage $\phi_{rd}{}^P$, $\phi_{rq}{}^P$: d-axial component, q-axial component about positive sequency component of rotor magnetic flux inter-linkage $\phi_{rd}{}^n$, $\phi_{rq}{}^n$: d-axial component, q-axial component about negative sequency component of rotor magnetic flux inter-linkage $\phi_{sd}{}^P$, $\phi_{sq}{}^P$: d-axial component, q-axial component about positive sequency component of stator magnetic flux inter-linkage $\phi_{sd}{}^n$, $\phi_{sq}{}^n$: d-axial component, q-axial component about negative sequency component of stator magnetic flux inter-linkage $L_s$, $L_r$: stator inductance, rotor inductance $L_m$: mutual inductance $L_{ls}$, $L_{lr}$: stator leakage inductance, rotor leakage inductance $\omega_s$, $\omega_r$, $\omega_{sl}$: stator angular velocity, rotor angular velocity, slip angular velocity $P_s$, $Q_s$: stator active power, stator reactive power $V_{DC}$: DC link voltage $\theta_s$, $\theta_r$, $\theta_{sl}$: stator magnetic flux angle, rotor magnetic flux angle, slip magnetic flux angle S, j: differential operator, imaginary number operator $\lambda_{11}$, $\lambda_{12}$, $\lambda_{21}$, $\lambda_{22}$, $K_{11}$, $K_{12}$: PI controller constant $V_{rds}{}^{p*}$, $V_{rqs}{}^{p*}$, $V_{rds}{}^{n*}$, $V_{rqs}{}^{n*}$: value that converts $V_{rd}{}^{p*}$, $V_{rq}{}^{p*}$, $V_{rd}{}^{n*}$, $V_{rq}{}^{n*}$ into 2 phase static coordinates respectively Hereinafter, the control method of the control device in the doubly-fed induction generator according to the present invention will be explained using a numerical expression.

The stator voltage equation and rotor voltage equation of the doubly-fed induction generator expressed in the static coordinates are represented as follows.

$$V_s = R_s i_s + (L_{ls}S)i_s + i_r) + j\omega_s \phi_s$$

$$V_r = R_r i_r + (L_{lr}S)i_r + (L_m S)(i_r + i_s) + j(\omega_s - \omega_r)\phi_r \quad \text{[Formula 1]}$$

Also, in the rotor voltage equation of the doubly-fed induction generator, when it is displayed after converting the positive sequency component into d and q coordinates, it will be represented as Formulae 2 and 3.

$$V_{rd}^p = R_r i_{rd}^p + \sigma L_r \frac{di_{rd}^p}{dt} - (\omega_s - \omega_r)\frac{L_m}{L_s}\varphi_{sq}^p - (\omega_s - \omega_r)\sigma L_r i_{rq}^p \quad \text{[Formula 2]}$$

$$V_{rq}^p = R_r i_{rq}^p + \sigma L_r \frac{di_{rq}^p}{dt} + (\omega_s - \omega_r)\frac{L_m}{L_s}\varphi_{sd}^p + (\omega_s - \omega_r)\sigma L_r i_{rd}^p \quad \text{[Formula 3]}$$

And, the stator magnetic flux inter-linkage, rotor magnetic flux inter-linkage, stator inductance, and rotor inductance and the like are equal to the formulae 4~7. Further, $\sigma L_r$ defined in the present invention is equal to the formula 8.

$$\varphi_s = L_s i_s + L_m i_r \quad \text{[Formula 4]}$$

$$\varphi_r = L_r i_r + L_m i_s \quad \text{[Formula 5]}$$

$$L_s = L_{ls} + L_m \quad \text{[Formula 6]}$$

$$L_r = L_{lr} + L_m \quad \text{[Formula 7]}$$

$$\sigma L_r = L_r\left(1 - \frac{L_m^2}{L_r L_s}\right) \quad \text{[Formula 8]}$$

A current control device is designed with a linear input-output relationship, unlike the related art in which a current controller is designed in a PI type by a rotor-side voltage equation. The fact that the input-output relationship is linear with a single input and a single output means that the relationship is not influenced by other parameters, except for the parameters in the relational expression. Therefore, the transient characteristics are greatly increased and it is possible to achieve unyieldingness that can maintain the control characteristics against variation characteristics of parameters, which are non-linearly varied, and the system voltage regulation.

Assuming that the input signal is the d-axial voltage (q-axial voltage) and the output is the d-axial current (q-axial current) in Formula 2 (Formula 3), it can be seen that it has a non-linear relationship because the input-output relationship is inversed, in a differential type.

As a result, after applying the relationships $\phi_{sd}{}^P = L_m i_{ms}{}^P$ in the formulae 2 and 3, when the polynomial expression may be arranged such that the differential term may be positioned on the right side, the formulae 9 and 10 are represented, below.

$$\frac{di_{rd}^p}{dt} = \frac{1}{\sigma L_r}(-R_r i_{rd}^p) + (\omega_s - \omega_r)i_{rq}^p + \frac{1}{\sigma L_r}(V_{rd}^p) \quad \text{[Formula 9]}$$

$$\frac{di_{rd}^p}{dt} = \frac{1}{\sigma L_r}\left\{\begin{array}{l}V_{rq}^p - R_r i_{rq}^p - (\omega_s - \omega_r)\frac{L_m^2}{L_s}(i_{ms}^p) - \\ (\omega_s - \omega_r)\sigma L_r i_{rd}^p\end{array}\right\} \quad \text{[Formula 10]}$$

Meanwhile, when the doubly-fed induction generator is controlled, the voltage vector is applied to the converter of the generator side, then PWM may be implemented such that the predetermined current may be flown, accordingly the input signals are defined as $V_{rd}{}^p$ and $V_{rq}{}^p$, and the output signals are defined as $i_{rd}{}^p$ and $i_{rq}{}^p$.

Based on the definition equation about the input/output parameters, it is classified the term with two input signals and the term without a input signal, and when it is represented in a matrix form, it becomes the Formula 11.

$$\begin{bmatrix} \dot{i}_{rd}^p \\ \dot{i}_{rq}^p \end{bmatrix} = \begin{bmatrix} \frac{1}{\sigma L_r}(-R_r i_{rd}^p) + (\omega_s - \omega_r)i_{rq}^p \\ \frac{1}{\sigma L_r}\left\{-R_r i_{rq}^p - (\omega_s - \omega_r)\frac{L_m^2}{L_s}(i_{ms}^p) - (\omega_s - \omega_r)\sigma L_r i_{rd}^p\right\} \end{bmatrix} + \begin{bmatrix} \frac{1}{\sigma L_r} \\ 0 \end{bmatrix} V_{rd}^p + \begin{bmatrix} 0 \\ \frac{1}{\sigma L_r} \end{bmatrix} V_{rq}^p \quad \text{[Formula 11]}$$

Regarding the Formula 11, for representing multi-input multi-output system with two input signals and two output signals, it is substituted with an equation defining the output to become the Formula 12.

$$\dot{x} = f(x) + g_1(x)u_1 + \ldots + g_2 u_2 \qquad \text{[Formula 12]}$$
$$y_1 = h_1(x)$$
$$\vdots$$
$$y_i = h_i(x)$$

In here, the definition of each variable is as follows.

$$x = \begin{bmatrix} i_{rd}^p \\ i_{rq}^p \end{bmatrix}; x_1 = i_{rd}^p, x_2 = i_{rq}^p \qquad \text{[Formula 13]}$$

$$f(x) = \qquad \text{[Formula 14]}$$
$$\begin{bmatrix} \frac{1}{\sigma L_r}(-R_r i_{rd}^p) + (\omega_s - \omega_r)i_{rq}^p \\ \frac{1}{\sigma L_r}\left\{-R_r i_{rq}^p - (\omega_s - \omega_r)\frac{L_m^2}{L_s}(i_{ms}^p) - (\omega_s - \omega_r)\sigma L_r i_{rd}^p\right\} \end{bmatrix}$$

$$g(x) = \begin{bmatrix} \frac{1}{\sigma L_r} & 0 \\ 0 & \frac{1}{\sigma L_r} \end{bmatrix}, g_1(x) = \begin{bmatrix} \frac{1}{\sigma L_r} \\ 0 \end{bmatrix}, g_2(x) = \begin{bmatrix} 0 \\ \frac{1}{\sigma L_r} \end{bmatrix} \qquad \text{[Formula 15]}$$

$$y(t) = h(x) = \begin{bmatrix} i_{rd}^p \\ i_{rq}^p \end{bmatrix}; y_1 = h_1(x) = i_{rd}^p, y_2 = h_2(x) = i_{rq}^p \qquad \text{[Formula 16]}$$

$$u_1 = v_{rd}^p, u_2 = v_{rq}^p \qquad \text{[Formula 17]}$$

It is required to differentiate the outputs and the differentiation should be repeated until an input term is acquired in the differentiate expressions, in order to design a control device that linearizes the relationship between the input signal and the output signal in the present invention.

Firstly, when the first output ($y_1$) is differentiated, the Formula 18 is obtained.

$$\dot{y}_1 = \frac{1}{\sigma L_r}(-R_r i_{rd}^p) + (\omega_s - \omega_r)i_{rq}^p + \frac{1}{\sigma L_r}u_1 \qquad \text{[Formula 18]}$$

As the control input signal $u_1$ appears in the results equation differentiated firstly for the first output $y_1$, no more differentiation is preformed, and the differentiation of the second output $y_2$ is executed. When the first differentiation of the second output $y_2$ is performed, the Formula 19 is obtained.

$$\dot{y}_2 = \frac{1}{\sigma L_r}\left\{-R_r i_{rq}^p - (\omega_s - \omega_r)\frac{L_m^2}{L_s}(i_{ms}^p) - (\omega_s - \omega_r)\sigma L_r i_{rd}^p\right\} + \frac{1}{\sigma L_r}u_2 \qquad \text{[Formula 19]}$$

As a result of firstly differentiating the second output $y_2$, the control input signal $u_2$ appeared in the equation, no more differentiation is performed. When the Formulae 18 and 19 are represented in a matrix form, it becomes the Formula 20 after classifying the term with an input and the term without an input.

$$\begin{bmatrix} \dot{y}_1 \\ \dot{y}_2 \end{bmatrix} = \qquad \text{[Formula 20]}$$
$$\begin{bmatrix} \frac{1}{\sigma L_r}(-R_r i_{rd}^p) + (\omega_s - \omega_r)i_{rq}^p \\ \frac{1}{\sigma L_r}\left\{-R_r i_{rq}^p - (\omega_s - \omega_r)\frac{L_m^2}{L_s}(i_{ms}^p) - (\omega_s - \omega_r)\sigma L_r i_{rd}^p\right\} \end{bmatrix} +$$
$$\begin{bmatrix} \frac{1}{\sigma L_r} & 0 \\ 0 & \frac{1}{\sigma L_r} \end{bmatrix} \begin{bmatrix} u_1 \\ u_2 \end{bmatrix}$$

Compared with the Formula 11 defined as the state variable and the input signal, it can be seen that the Formula 20 may be transformed into the relationship equation defined as the output and input signals. However, as it is still a form of differentiation, it may be seen that the input and output relationships can be linearized by transforming a nonlinear form into a linear form.

For this purpose, in order that the controller input $u_i$ may have the solution in the Formula 20 firstly, the inverse matrix about the matrix as the coefficient term of the controller input should be existed. Therefore, in order to determine whether the solution exists, prepare the Formula 21 by substituting the Formula 20 with the matrix, and inspect the reverse matrix.

$$\begin{bmatrix} \dot{y}_1 \\ \dot{y}_2 \end{bmatrix} = A(t) + E(t)\begin{bmatrix} u_1 \\ u_2 \end{bmatrix} \qquad \text{[Formula 21]}$$

$$A(t) \triangleq \begin{bmatrix} A_{11} \\ A_{21} \end{bmatrix}$$

$$A_{11}(t) \triangleq \frac{1}{\sigma L_r}(-R_r i_{rd}^n) + (\omega_s - \omega_r)i_{rq}^n$$

$$A_{21}(t) \triangleq \frac{1}{\sigma L_r}\left\{ \begin{array}{c} -R_r i_{rq}^n - (-\omega_s - \omega_r)\frac{L_m^2}{L_s}(i_{ms}^n) - \\ (-\omega_s - \omega_r)\sigma L_r i_{rd}^n \end{array} \right\}$$

$$E(t) \triangleq \begin{bmatrix} \frac{1}{\sigma L_r} & 0 \\ 0 & \frac{1}{\sigma L_r} \end{bmatrix}$$

In the Formula 21, when the reverse matrix of the matrix E(t) is calculated, it becomes the Formula 22.

$$E^{-1}(t) = \begin{bmatrix} \sigma L_r & 0 \\ 0 & \sigma L_r \end{bmatrix} \qquad \text{[Formula 22]}$$

Therefore, in order that the Formula 21 may have the solution all the time, when the condition of $(\sigma L_\gamma)(\sigma L_\gamma) \neq 0$ is met, it has a solution as the reverse matrix is not "0". It can be seen that it always has a satisfactory solution, since the rotor side inductance value of the doubly-fed induction generator is not always "0".

In the Formula 21, when the differential value $\dot{y}_i$ of the output as nonlinear term is substituted with a new state variable $v_i$ for linearization, it may be substituted like the Formula 23.

$$\begin{bmatrix} \dot{y}_1 \\ \dot{y}_2 \end{bmatrix} = \begin{bmatrix} v_1 \\ v_2 \end{bmatrix}$$ [Formula 23]

When the Formula 23 is substituted with the Formula 20 before substituting the Formula 22, the rule for determining the control signal may be obtained. That is proposed in the Formula 24. The Formula 24 described as below may be used as the current controller of the positive sequence component utilized in the control device of the doubly-fed induction generator according to the present invention.

$$\begin{bmatrix} u_1 \\ u_2 \end{bmatrix} = \begin{bmatrix} (R_r i_{rd}^p) - (\omega_s - \omega_r)\sigma L_r i_{rq}^p + \sigma L_r v_1 \\ \left\{ R_r i_{rq}^p + (\omega_s - \omega_r)\dfrac{L_m^2}{L_s}(i_{ms}^p) + \atop (\omega_s - \omega_r)\sigma L_r i_{rd}^p \right\} + \sigma L_r v_2 \end{bmatrix}$$ [Formula 24]

Meanwhile, when the Formula 17 is substituted with the Formula 24 where the expression 17 is a defined equation about the input signal of the controller, the current control device applicable to the doubly-fed induction generator may be obtained as the Formula 25. It can be seen that it is configured with a term that makes the tolerance "0" and a feed-forward term to entirely decouple another input.

$$\begin{bmatrix} v_{rd}^p \\ v_{rq}^p \end{bmatrix} = \begin{bmatrix} \{R_r i_{rd}^p + \sigma L_r v_1\} - (\omega_s - \omega_r)\sigma L_r i_{rq}^p \\ \{R_r i_{rq}^p + \sigma L_r v_2\} + \left\{ (\omega_s - \omega_r)\dfrac{L_m^2}{L_s}(i_{ms}^p) + \atop (\omega_s - \omega_r)\sigma L_r i_{rd}^p \right\} \end{bmatrix}$$ [Formula 25]

In here, a new state variable may be designed so as to determine using the tolerance and regulation for the control input, and using the Formula 26 or Formula 27, the tolerance is controlled to "0".

$$v_1 = \lambda_{11}(y_1^* - y_1) + \lambda_{12}\int(y_1^* - y_1)dt$$

$$v_2 = \lambda_{21}(y_2^* - y_2) + \lambda_{22}\int(y_2^* - y_2)dt$$ [Formula 26]

$$v_1 = \dot{y}_1^* + \lambda_{11}(y_1^* - y_1) + \lambda_{12}\int(y_1^* - y_1)dt$$

$$v_2 = \dot{y}_2^* + \lambda_{21}(y_2^* - y_2) + \lambda_{22}\int(y_2^* - y_2)dt$$ [Formula 27]

At this point, $y_1^* = i_{rd}^{p*}$ and $y_2^* = i_{rq}^{p*}$, it represents $y_1 = i_{rd}^p$, $y_2 = i_{rq}^p$.

Figure 6:
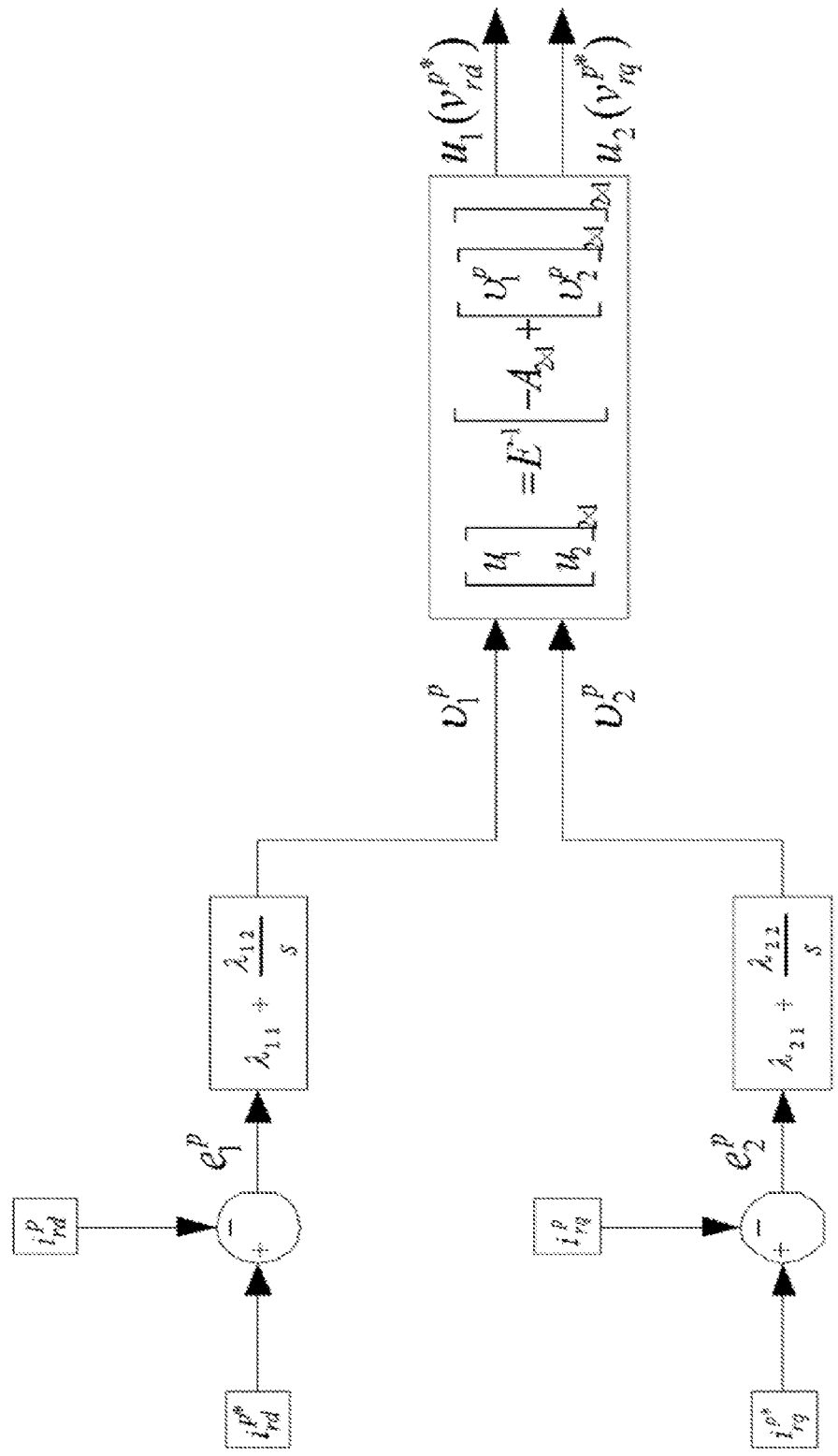
FIG. 6 is a view illustrating a control algorithm of the positive sequency component current controller for controlling the doubly-fed induction generator according to the first embodiment of the present invention.
Figure 7:
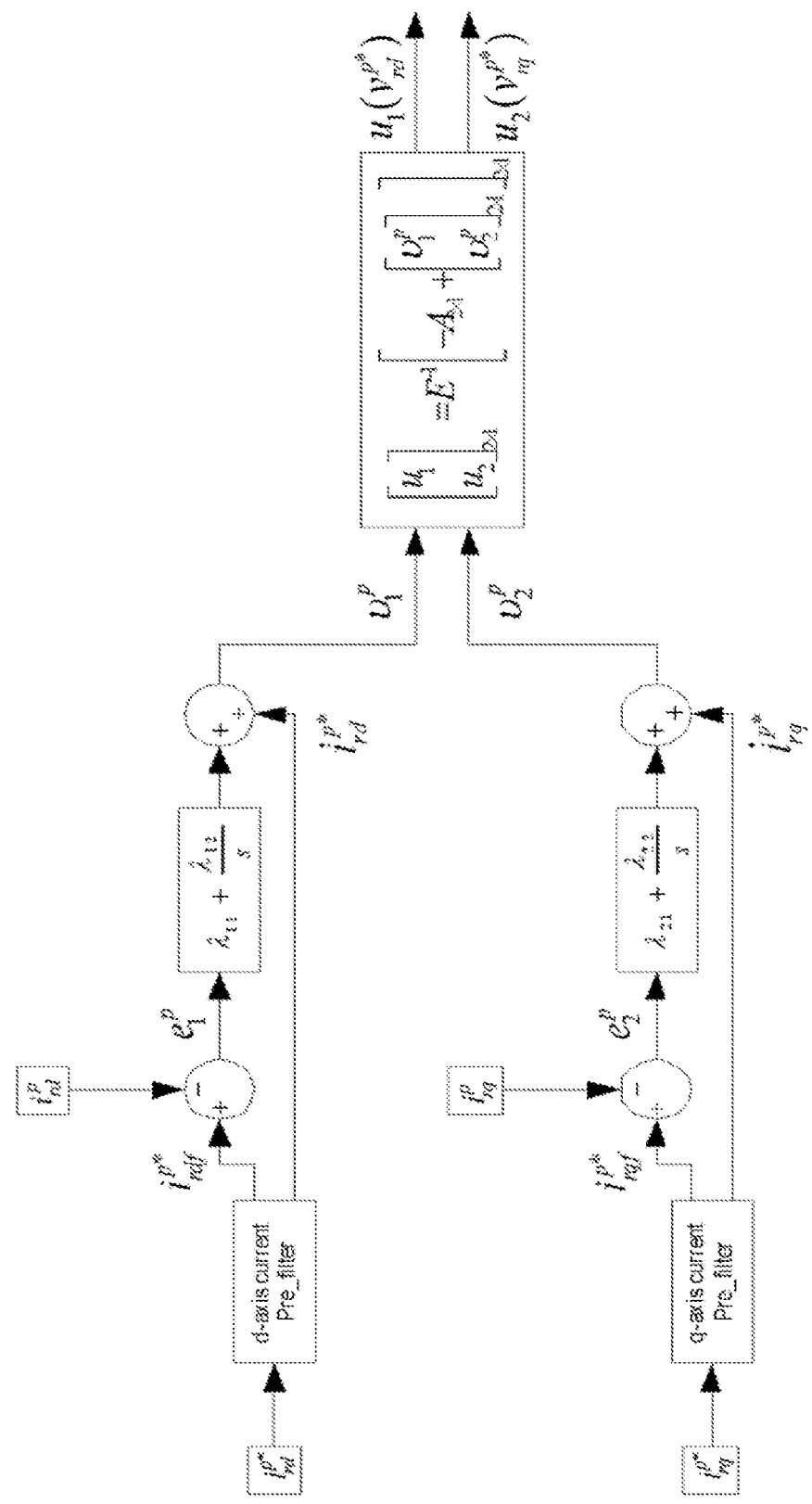
FIG. 7 is a view illustrating a control algorithm of the positive sequency component current controller for controlling the doubly-fed induction generator according to the second embodiment of the present invention.

FIGS. 6 and 7 illustrate the first and second embodiments of the current controller in the positive sequence component using a control algorithm described before. The second embodiment illustrated in FIG. 7 is that for applying the determining method in determining the portion of the new state variable $v_1^p$, $v_2^p$ from the tolerance $e_1^p$, $e_2^p$ using the pre-filter.

Next, the control method of the current controller in negative sequence component for controlling the doubly-fed induction generator according to the present invention will be explained. In the invention, the control method of the current controller in negative sequence component may be configured with the same method as the control algorithm of the current controller in the positive sequence component described before, herein detailed descriptions of the same or similar constitution may be omitted.

First of all, the negative sequency component in the stator voltage equation and rotor voltage equation of the doubly-fed induction generator expressed in the static coordinates is represented as the Formula 28.

$$V_s^n = R_s i_s^n + (L_{ls}S)i_s^n + (L_m S)(i_s^n + i_r^n) + j(-\omega_s)\phi_s^n$$

$$V_r^n = R_r i_r^n + (L_{lr}S)i_r^n + (L_m S)(i_r^n + i_s^n) + j(-\omega_s - \omega_r)\phi_r^n$$ [Formula 28]

$$\phi_s^n = L_s i_s^n + L_m i_r^n$$

In here, $$\phi_r^n = L_r i_r^n + L_m i_s^n$$

At this point, in case of expressing d, q voltage equation of the negative sequency component using the rotor voltage equation, it will be represented as the Formulae 29, 30.

$$V_{rd}^n =$$ [Formula 29]
$$R_r i_{rd}^n + \sigma L_r \frac{d i_{rd}^n}{dt} - (-\omega_s - \omega_r)\frac{L_m}{L_s}\varphi_{sq}^n - (-\omega_s - \omega_r)\sigma L_r i_{rq}^n$$

$$V_{rq}^n =$$ [Formula 30]
$$R_r i_{rq}^n + \sigma L_r \frac{d i_{rq}^n}{dt} + (-\omega_s - \omega_r)\frac{L_m}{L_s}\varphi_{sd}^n + (-\omega_s - \omega_r)\sigma L_r i_{rd}^n$$

For preparing the Formulae 29 and 30 in the form of the state equation, when the polynomial expression is arranged so that the differential term may be positioned on the left side, it becomes the Formulae 31 and 32. Also, when it is represented in a matrix form after defining the input signal as $V_{rd}^n$, $V_{rq}^n$ and the output signal as $i_{rd}^n$, $i_{rq}^n$, it becomes the Formula 33.

$$\frac{d i_{rd}^n}{dt} = \frac{1}{\sigma L_r}(-R_r i_{rd}^n) + (-\omega_s - \omega_r)i_{rq}^n + \frac{1}{\sigma L_r}(V_{rd}^n)$$ [Formula 31]

$$\frac{d i_{rq}^n}{dt} = \frac{1}{\sigma L_r}$$ [Formula 32]
$$\left\{ V_{rq}^n - R_r i_{rq}^n - (-\omega_s - \omega_r)\frac{L_m^2}{L_s}(i_{ms}^n) - (-\omega_s - \omega_r)\sigma L_r i_{rd}^n \right\}$$

$$\begin{bmatrix} i_{rd}^n \\ i_{rq}^n \end{bmatrix} = \begin{bmatrix} \dfrac{1}{\sigma L_r}(-R_r i_{rd}^n) + (-\omega_s - \omega_r)i_{rq}^n \\ \dfrac{1}{\sigma L_r}\left\{ -R_r i_{rq}^n - (-\omega_s - \omega_r)\dfrac{L_m^2}{L_s}(i_{ms}^n) - \atop (-\omega_s - \omega_r)\sigma L_r i_{rd}^n \right\} \end{bmatrix} + \begin{bmatrix} \dfrac{1}{\sigma L_r} \\ 0 \end{bmatrix}V_{rd}^n + \begin{bmatrix} 0 \\ \dfrac{1}{\sigma L_r} \end{bmatrix}V_{rq}^n$$ [Formula 33]

Regarding the Formula 33, for representing multi-input multi-output system with two input signals and two output signals, it is arranged with the equation defining the output, and then it becomes the Formula 34.

$$\dot{x} = f(x) + g_1(x)u_1 + \ldots + g_2 u_2$$ [Formula 34]
$$y_1 = h_1(x)$$
$$\vdots$$
$$y_i = h_i(x)$$

In here, the definition of each variable is as follows.

$$x = \begin{bmatrix} i^n_{rd} \\ i^n_{rq} \end{bmatrix}; x_1 = i^n_{rd}, x_2 = i^n_{rq} \quad \text{[Formula 35]}$$

$$f(x) = \begin{bmatrix} \frac{1}{\sigma L_r}(-R_r i^n_{rd}) + (-\omega_s - \omega_r) i^n_{rq} \\ \frac{1}{\sigma L_r}\left\{ \begin{array}{l} -R_r i^n_{rq} - (-\omega_s - \omega_r) \frac{L_m^2}{L_s}(i^n_{ms}) - \\ (-\omega_s - \omega_r) \sigma L_r i^n_{rd} \end{array} \right\} \end{bmatrix} \quad \text{[Formula 36]}$$

$$g(x) = \begin{bmatrix} \frac{1}{\sigma L_r} & 0 \\ 0 & \frac{1}{\sigma L_r} \end{bmatrix}, g_1(x) = \begin{bmatrix} \frac{1}{\sigma L_r} \\ 0 \end{bmatrix}, \quad \text{[Formula 37]}$$

$$g_2(x) = \begin{bmatrix} 0 \\ \frac{1}{\sigma L_r} \end{bmatrix}$$

$$y(t) = h(x) = \begin{bmatrix} i^n_{rd} \\ i^n_{rq} \end{bmatrix}; y_1 = h_1(x) = i^n_{rd}, \quad \text{[Formula 38]}$$

$$y_2 = h_2(x) = i^n_{rq}$$

$$u_1 = v^n_{rd}, u_2 = v^n_{rq} \quad \text{[Formula 39]}$$

As mentioned before, it is required to differentiate the outputs and the differentiation should be repeated until an input term is acquired in the differentiate expressions, in order to design a control device that linearizes the relationship between the input signal and the output signal in the present invention. First, once the first output ($y_1$) is differentiated, the Formula 40 is obtained.

$$\dot{y}_1 = \frac{1}{\sigma L_r}(-R_r i^n_{rd}) + (-\omega_s - \omega_r) i^n_{rq} + \frac{1}{\sigma L_r} u_1 \quad \text{[Formula 40]}$$

Since the control input signal $u_1$ appears in the results equation differentiated firstly for the first output $y_1$, no more differentiation is performed, and the differentiation of the second output $y_2$ is executed. When the first differentiation of the second output $y_2$ is performed, the Formula 41 is obtained.

$$\dot{y}_2 = \frac{1}{\sigma L_r}\left\{ \begin{array}{l} -R_r i^n_{rq} - (-\omega_s - \omega_r) \frac{L_m^2}{L_s}(i^n_{ms}) - \\ (-\omega_s - \omega_r) \sigma L_r i^n_{rd} \end{array} \right\} + \frac{1}{\sigma L_r} u_2 \quad \text{[Formula 41]}$$

As a result of differentiating the second output $y_2$, the control input signal $u_2$ appears in the equation, accordingly no more differentiation is performed. Formula 42 is acquired by expressing Formulae 40 and 41 in a matrix type and arranging the terms with the input and the terms without input.

$$\begin{bmatrix} \dot{y}_1 \\ \dot{y}_2 \end{bmatrix} = \begin{bmatrix} \frac{1}{\sigma L_r}(-R_r i^n_{rd}) + (-\omega_s - \omega_r) i^n_{rq} \\ \frac{1}{\sigma L_r}\left\{ \begin{array}{l} -R_r i^n_{rq} - (-\omega_s - \omega_r) \frac{L_m^2}{L_s}(i^n_{ms}) - \\ (-\omega_s - \omega_r) \sigma L_r i^n_{rd} \end{array} \right\} \end{bmatrix} + \quad \text{[Formula 42]}$$

$$\begin{bmatrix} \frac{1}{\sigma L_r} & 0 \\ 0 & \frac{1}{\sigma L_r} \end{bmatrix} \begin{bmatrix} u_1 \\ u_2 \end{bmatrix}$$

It can be seen that Formula 42 was transformed in an expression defined by output and input signals, as compared with Formula 33 defined by state variables and input signals. However, since it is still a differential type, it can be seen that it is possible to linearize the relationship between the input and the output by converting the non-linear type into a linear type. For this purpose, an inverse matrix of the matrix corresponding to the coefficient term of the controller input should exist so that the controller input has a solution in Formula 20. It becomes Formula 43 by transforming Formula 42 into a matrix to ascertain whether a solution exists. It is possible to acquire rotor reference voltage illustrated in a two-phase stationary reference frame by transforming the output of a positive sequency component current controller FL1 and the output of a negative sequency component current controller FL2 (Transform 1 and Transform 2) and composing the same components, in the present invention.

$$\begin{bmatrix} \dot{y}_1 \\ \dot{y}_2 \end{bmatrix} = A(t) + E(t) \begin{bmatrix} u_1 \\ u_2 \end{bmatrix} \quad \text{[Formula 43]}$$

여기서

$$A(t) \triangleq \begin{bmatrix} A_{11} \\ A_{21} \end{bmatrix}$$

$$A_{11}(t) \triangleq \frac{1}{\sigma L_r}(-R_r i^n_{rd}) + (-\omega_s - \omega_r) i^n_{rq}$$

$$A_{21}(t) \triangleq \frac{1}{\sigma L_r}\left\{ \begin{array}{l} -R_r i^n_{rq} - (-\omega_s - \omega_r) \frac{L_m^2}{L_s}(i^n_{ms}) - \\ (-\omega_s - \omega_r) \sigma L_r i^n_{rd} \end{array} \right\}$$

$$E(t) \triangleq \begin{bmatrix} \frac{1}{\sigma L_r} & 0 \\ 0 & \frac{1}{\sigma L_r} \end{bmatrix}$$

In the Formula 43, when calculating the reverse matrix of the matrix E(t), it becomes the Formula 44.

$$E^{-1}(t) = \begin{bmatrix} \sigma L_r & 0 \\ 0 & \sigma L_r \end{bmatrix} \quad \text{[Formula 44]}$$

$(\sigma L_r)(\sigma L_r) \neq 0$ As mentioned before, since in the doubly-fed induction generator, it can be seen that it always has a satisfactory solution.

$\dot{y}_i, v_i$ In the Formula 43, for the purpose of substituting the differential value of the output as nonlinear term with the new state variable to thereby make linearization, it is substituted as the Formula 45, below.

$$\begin{bmatrix} \dot{y}_1 \\ \dot{y}_2 \end{bmatrix} = \begin{bmatrix} v_1 \\ v_2 \end{bmatrix} \quad \text{[Formula 45]}$$

When the Formula 45 is substituted with Formula 43, and substituted with the Formula 44, the rule for determining the control signal may be obtained. That was proposed in the Formula 46. The Formula 46 described as below may be used as the current controller of the negative sequency component utilized in the control device of the doubly-fed induction generator according to the present invention.

$$\begin{bmatrix} u_1 \\ u_2 \end{bmatrix} = \begin{bmatrix} (R_r i_{rd}^n) - (-\omega_s - \omega_r)\sigma L_r i_{rq}^n + \sigma L_r v_1 \\ \left\{ R_r i_{rq}^n + (-\omega_s - \omega_r)\frac{L_m^2}{L_s}(i_{ms}^n) + \right. \\ \left. (-\omega_s - \omega_r)\sigma L_r i_{rd}^n \right\} + \sigma L_r v_2 \end{bmatrix}$$ [Formula 46]

Meanwhile, when the Formula 39 is substituted with the Formula 46 where the expression 39 is a defined equation of the input signal of the controller, the current control device applicable to the doubly-fed induction generator may be obtained as the Formula 47. It can be seen that it may be configured with a term that makes the tolerance "0" and a feed-forward term, for entirely decoupling another input.

$$\begin{bmatrix} v_{rd}^n \\ v_{rq}^n \end{bmatrix} = \begin{bmatrix} (R_r i_{rd}^n) - (-\omega_s - \omega_r)\sigma L_r i_{rq}^n + \sigma L_r v_1 \\ \left\{ R_r i_{rq}^n + (-\omega_s - \omega_r)\frac{L_m^2}{L_s}(i_{ms}^n) + \right. \\ \left. (-\omega_s - \omega_r)\sigma L_r i_{rd}^n \right\} + \sigma L_r v_2 \end{bmatrix}$$ [Formula 47]

In here, the new state variable may be designed so as to determine using the tolerance and regulation of the control input, and using the Formula 48 or Formula 49, the tolerance may be controlled to "0".

$$v_1 = \lambda_{11}(y_1^* - y_1) + \lambda_{12}\int(y_1^* - y_1)dt$$

$$v_2 = \lambda_{21}(y_2^* - y_2) + \lambda_{22}\int(y_2^* - y_2)dt$$ [Formula 48]

$$v_1 = y_1^* + \lambda_{11}(y_1^* - y_1) + \lambda_{12}\int(y_1^* - y_1)dt$$

$$v_2 = y_2^* + \lambda_{21}(y_2^* - y_2) + \lambda_{22}\int(y_2^* - y_2)dt$$ [Formula 49]

Figure 8:
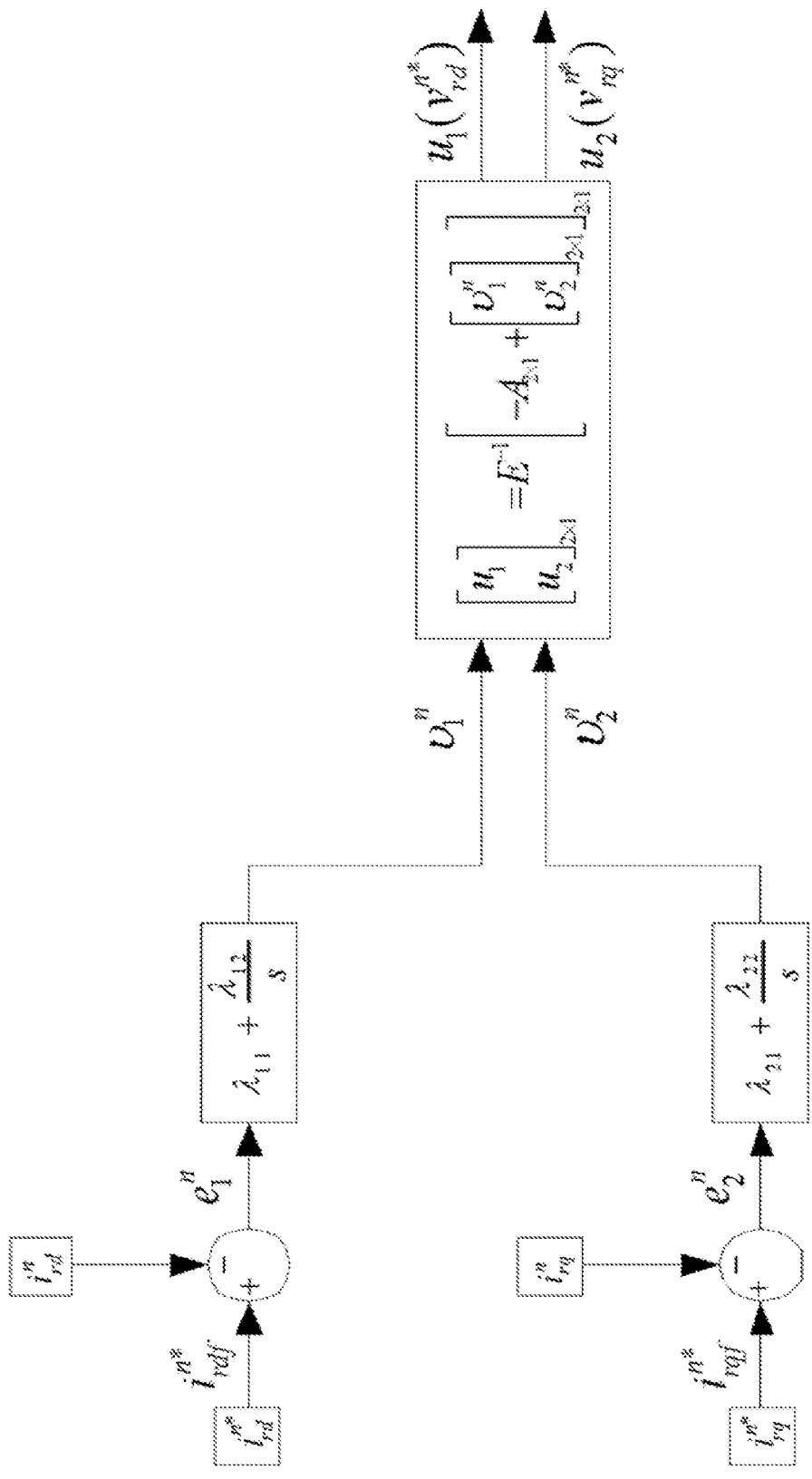
FIG. 8 is a view illustrating a control algorithm of the negative sequency component current controller for controlling the doubly-fed induction generator according to the first embodiment of the present invention.
Figure 9:
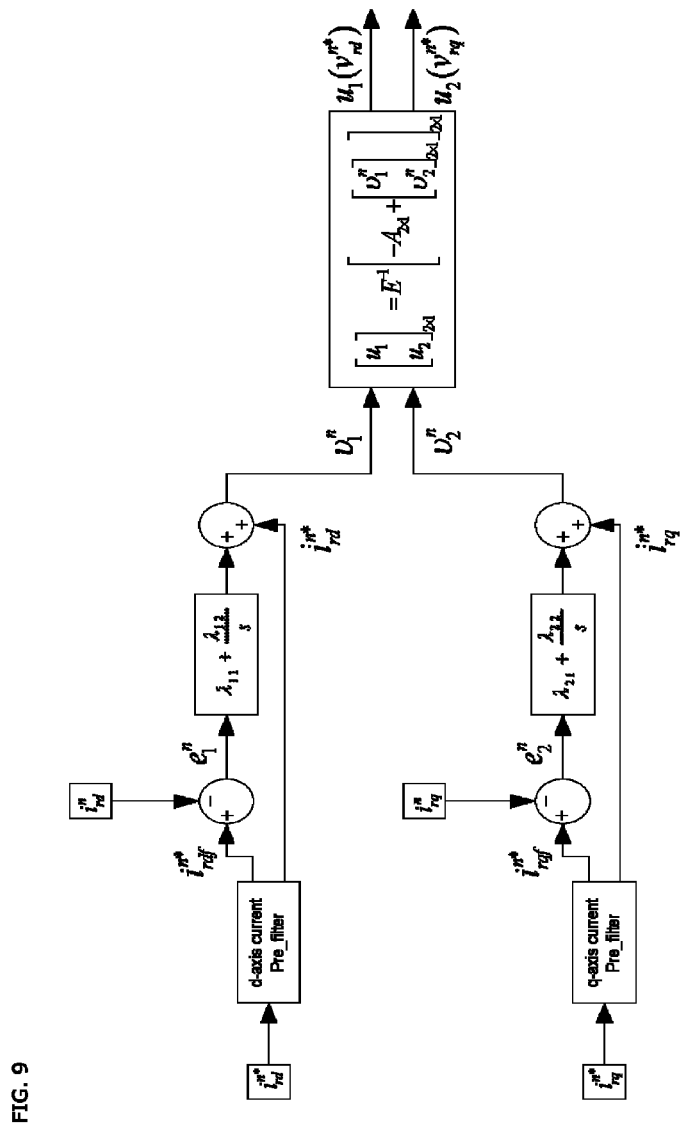
FIG. 9 is a view illustrating a control algorithm of the negative sequency component current controller for controlling the doubly-fed induction generator according to the second embodiment of the present invention.

FIGS. 8 and 9 illustrate the first and second embodiments of the current controller in the positive sequency component using the control algorithm described before. The second embodiment illustrated in FIG. 9 is that for applying the determining method in determining the portion of the new state variable $v_1''$, $v_2''$ from the tolerance $e_1''$, $e_2''$ using the pre-filter.

By coupling the current controller in current phase component and the current controller in negative sequency component, the current control device for controlling the doubly-fed induction generator according to the present invention may be implemented.

Figure 10:
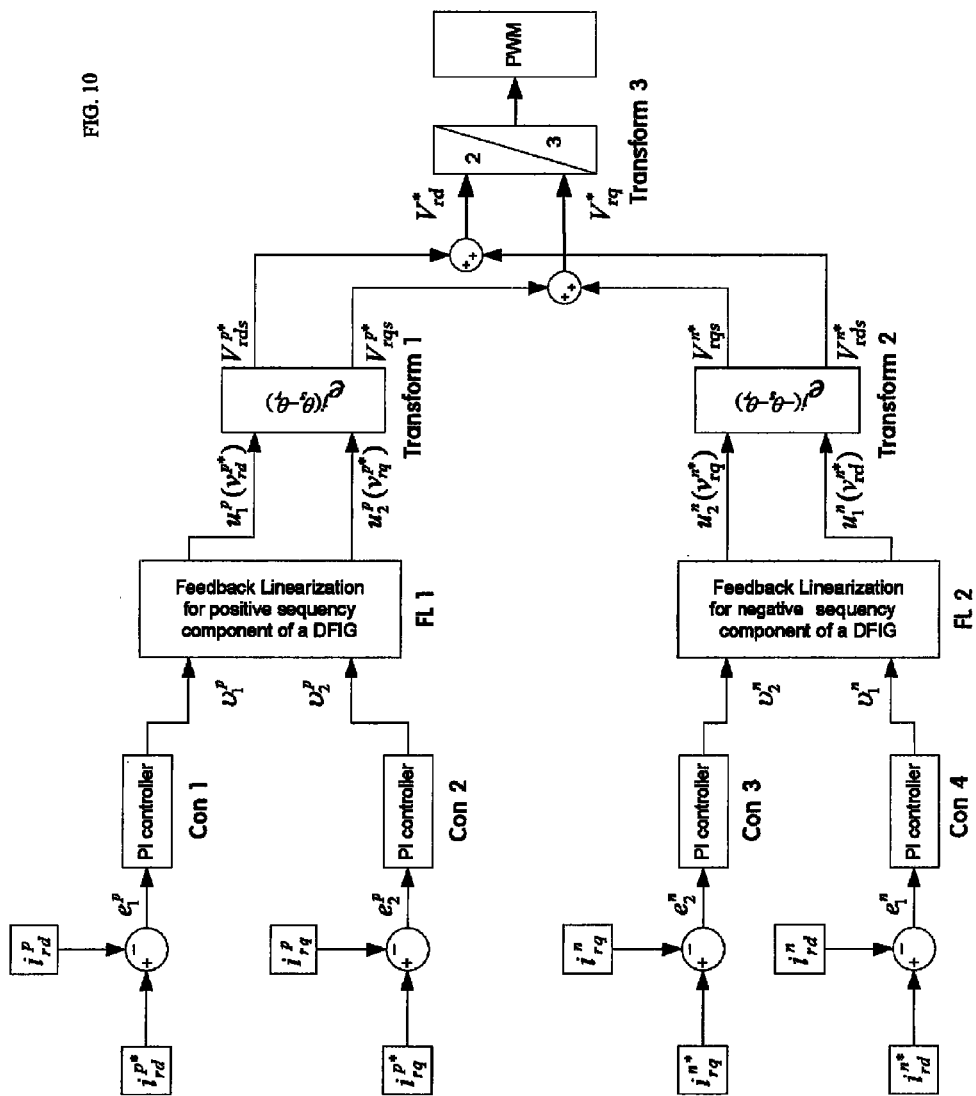
FIG. 10 is a view illustrating a control algorithm of the control device of the doubly-fed induction generator according to the first embodiment of the present invention.

FIG. 10 illustrates the control device of the doubly-fed induction generator according to the first embodiment of the present invention.

In FIG. 10, the internal controller con1, con2, con3, con4 determines the error function and new state variable $v_i$ using the PI controller, and the current controller FL1, FL2 included in the current control device according to the present invention linearizes the input/output relations using the feedback linearization method as mentioned before. in this case, the FL1 represents the Formula 25, and FL2 represents the Formula 47 of the present invention.

The rotor reference voltage in two phase static coordinates may be obtained by uniting the same components after transforming (Transform 1, Transform 2) the output of the current controller in positive sequency component and the output the current controller in negative sequency component into the static coordinates respectively. At this point, a PWM input signal may be obtained by transforming (Transform 3) the rotor reference voltage of two phase static coordinates into that of three phase static coordinates.

Figure 11:
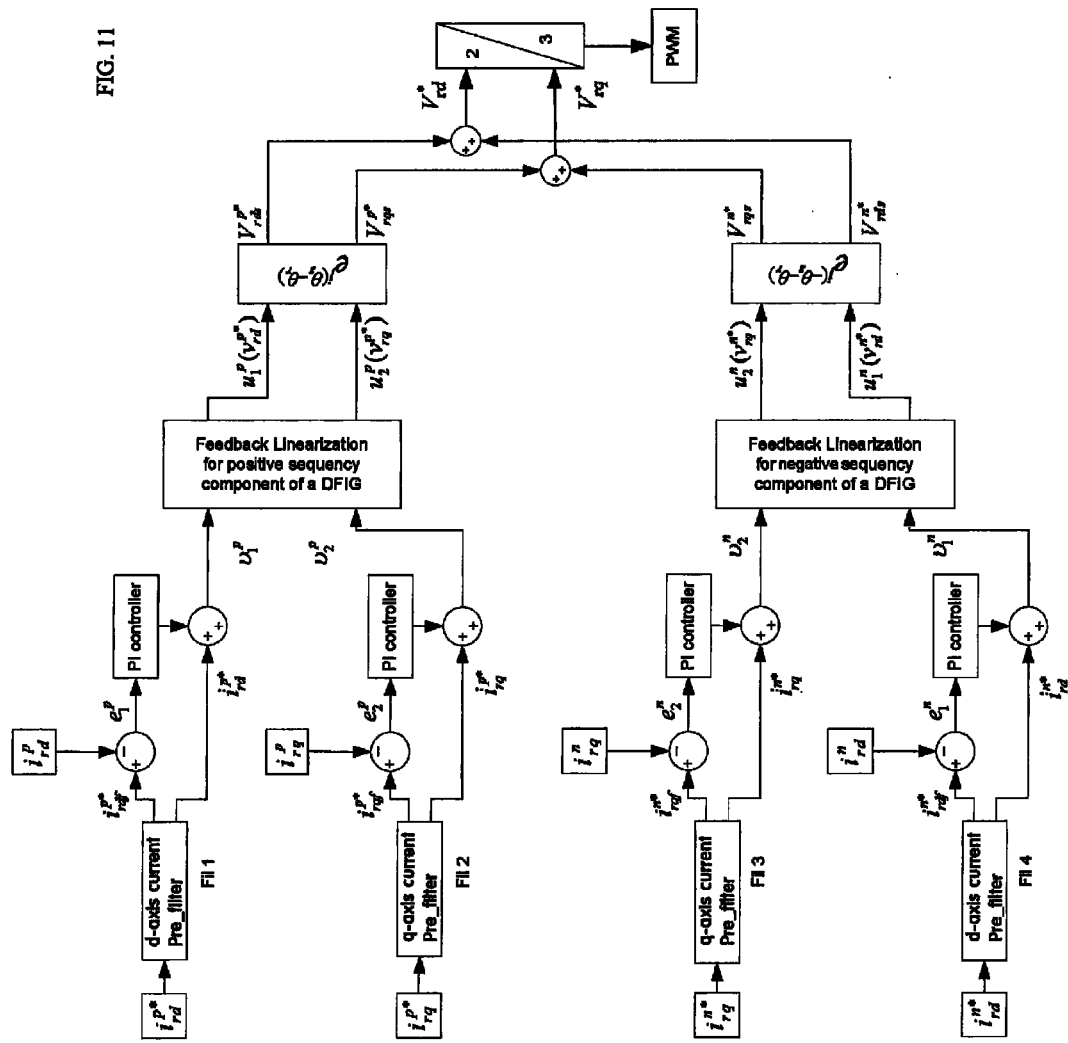
FIG. 11 is a view illustrating a control algorithm of the control device of the doubly-fed induction generator according to the second embodiment of the present invention.
Figure 12:
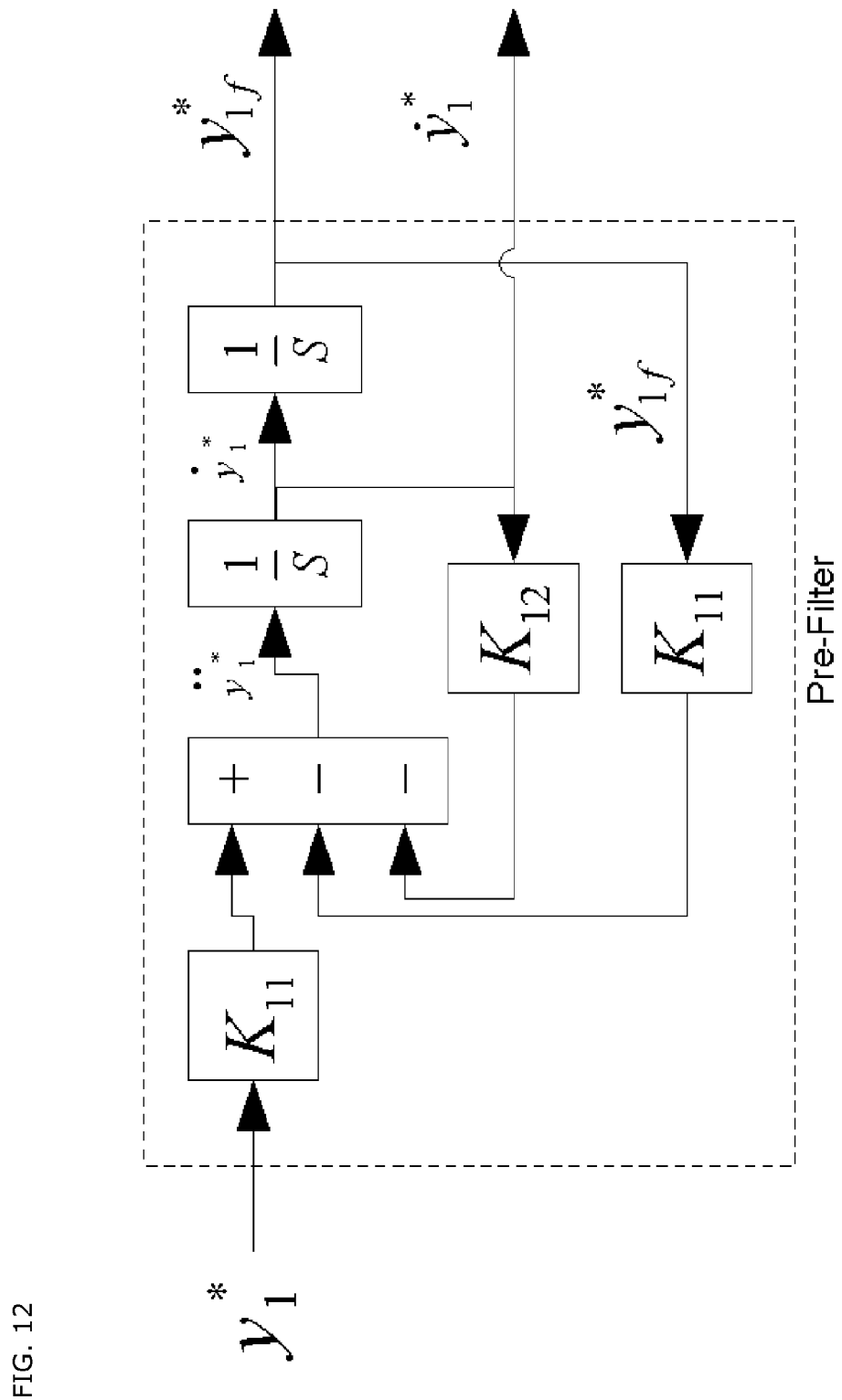
FIG. 12 is a view illustrating an internal structure of the pre-filter used in the second embodiment.

FIG. 11 illustrates the control device of the doubly-fed induction generator according to the second embodiment of the present invention, herein the new state variable $v_i$ from the tolerance $e_1^p$, $e_2^p$, $e_1''$, $e_2''$ of the first embodiment is determined using the pre-filter. The internal constitutional diagram of the pre-filter represents a low-band pass filter illustrated in FIG. 12.

Figure 13:
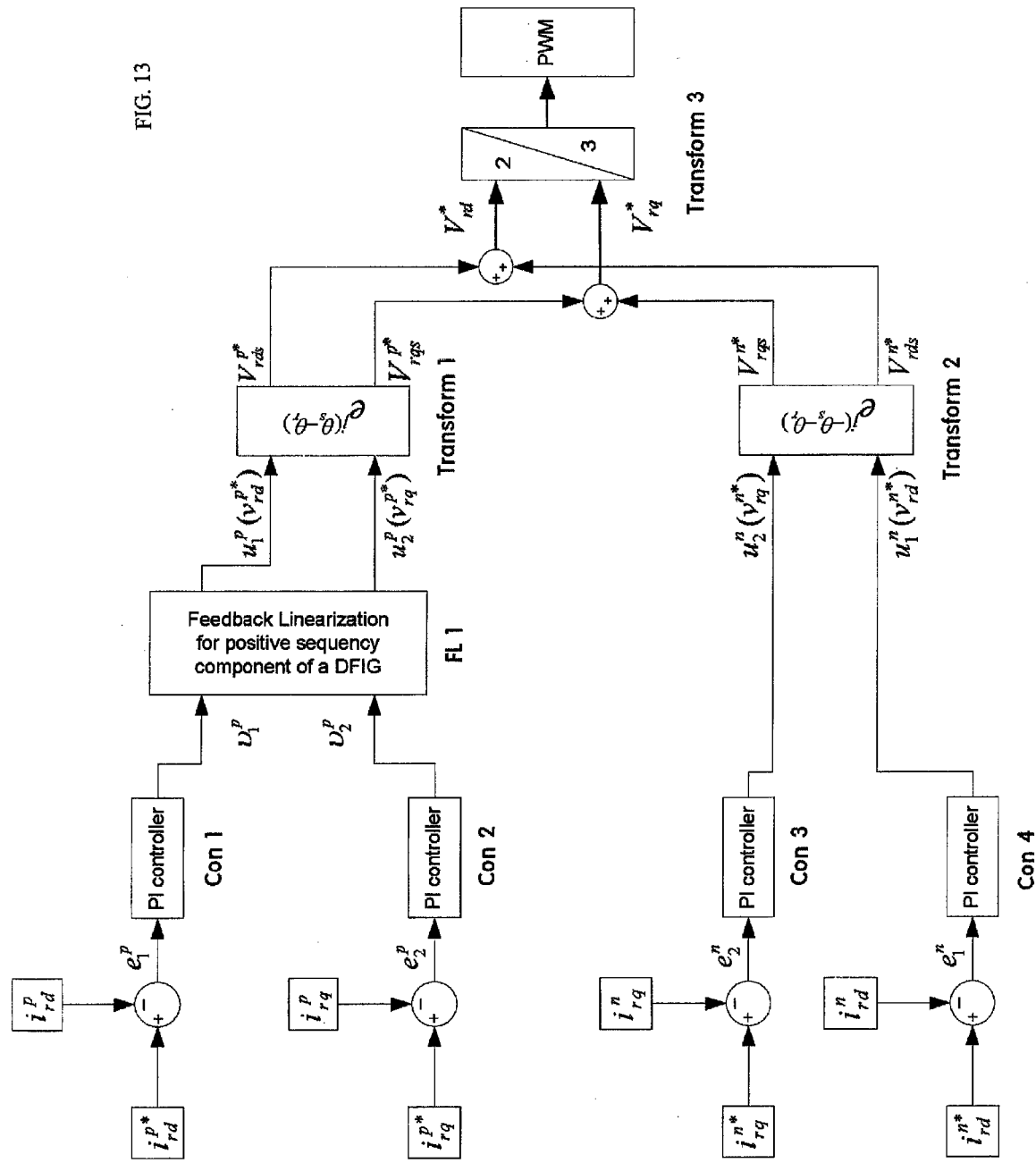
FIG. 13 is a view illustrating a control algorithm of the control device of the doubly-fed induction generator according to the third embodiment of the present invention.

Meanwhile, FIG. 13 illustrates the control device of the doubly-fed induction generator according to the third embodiment of the present invention. Referring to the third embodiment, the control input may be determined immediately by applying the tolerance $e_1''$, $e_2''$ to the PI controller without applying the feedback linearization method to the current controller in negative sequency component.

As such, the present invention provides a doubly-fed induction generator capable of controlling a positive sequency component and a negative sequency component, which have non-linear characteristics, to be linearized while controlling the positive sequency component and the negative sequency component of the current of a rotor in a doubly-fed induction generator, respectively, for a d-axis and a q-axis.

It is possible to achieve large effect by performing sequence control while applying the control device according to an embodiment of the present invention. The sequence control implies a method of controlling a stator-side main switch in a power conversion device and brake dynamic breakers at both ends of the DC-link.

Figure 14:
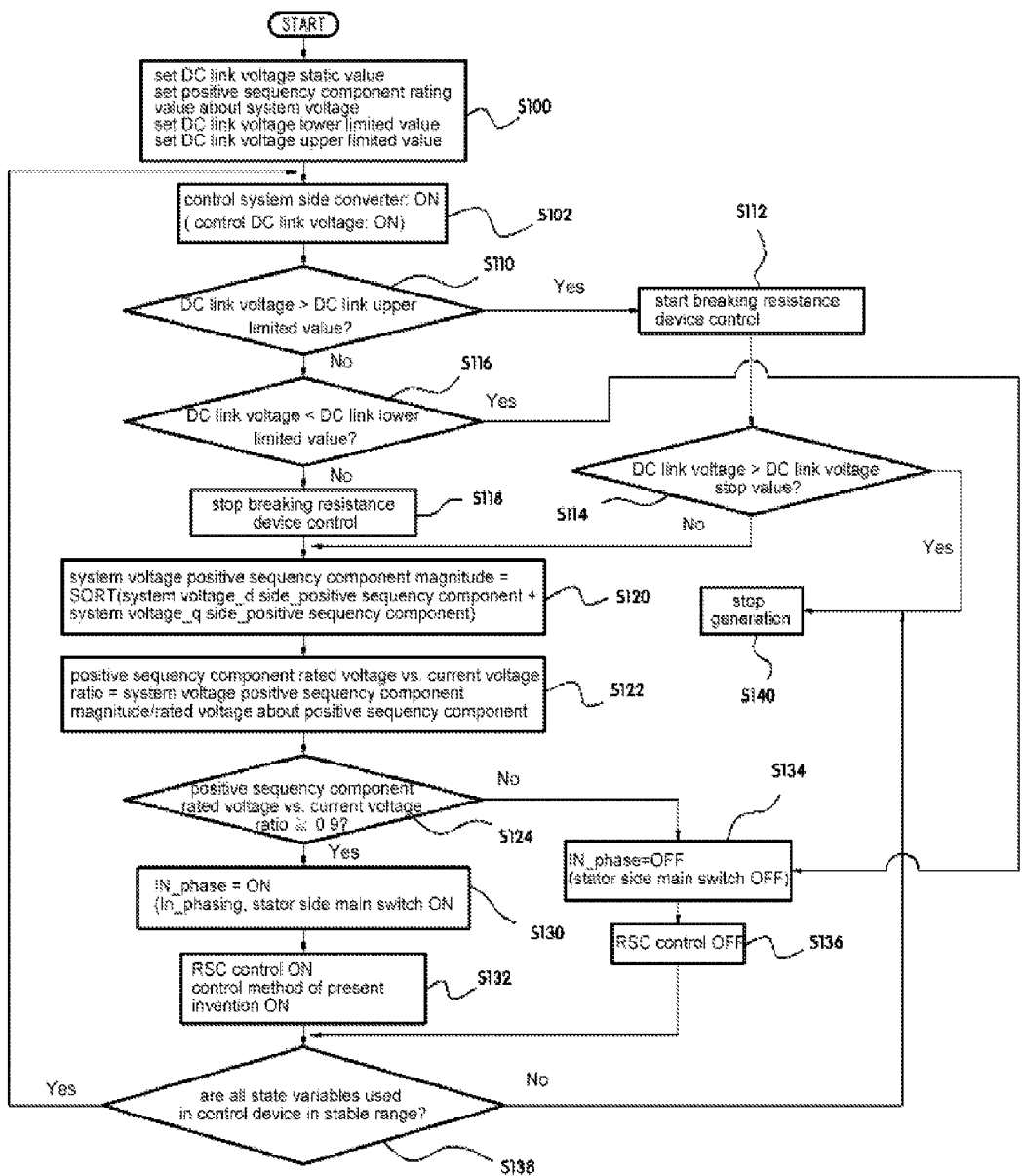
FIG. 14 is a sequence diagram illustrating an operating method of the doubly-fed induction generator having LVRT (Low Voltage Ride-Through) function.

FIG. 14 illustrates an operation control method of the doubly-fed induction generator having LVRT function. The operation control method illustrates a method of controlling on/off in the stator side main switch due to the voltage state of the DC link and the system voltage state. The DC link voltage lower limited value and upper limited value means DC link voltage upper and lower limited values where the system side convertor should maintain a control state, and the DC link voltage static value means a permissible bearable pressure in the consideration of the capacitor attached in parallel to both sides of DC link voltage. The set value has a relation of "DC link voltage lower limited value<DC link voltage upper limited value<DC link voltage static value".

According to the embodiment of the present invention, the control device performs sequence control such that a stator-side main switch is turned on, when the magnitude of the system voltage positive sequency component is more than 90% of the rated voltage of the positive sequency component, and the DC-link voltage is between the upper limit of the DC-link voltage and a lower limit of the DC-link voltage.

However, it is possible to implement the LVRT function by turning off the stator-side main switch (S134), when the magnitude of the system voltage positive sequency component is less than 90% of the rated voltage of the positive sequency component (S124), even if the upper DC-link voltage is between the upper limit of the DC-link voltage and the lower limit of the DC-link voltage (S110, S116).

When the stator side main switch is on S130, the control device according to the present invention may be operated to control the rotor side converter RSC of the doubly-fed induction generator S132.

In this case, the DC-link voltage normalizes in the stator-side main switch that has been turned off, and the stator-side main switch can be turned on again when the system voltage normalizes (S138). An IN_phase process is necessary (S130)

while the stator-side main switch that has been turned off is turned on. The In_phase method is not included in the technical characteristics of the present invention, such that the detailed description is not provided.

On the other hand, brake resistance devices attached in parallel at both ends of the DC-link is turned on when the DC-link voltage is larger than the upper limit of the DC-link voltage (S112), and performs sequence control to be turned off when the DC-link voltage comes in the normal range. Further, the power generation is stopped by stopping the power conversion device (S140), when the DC-link voltage becomes larger than the stop value of the DC-link voltage (S114).

Figure 15:
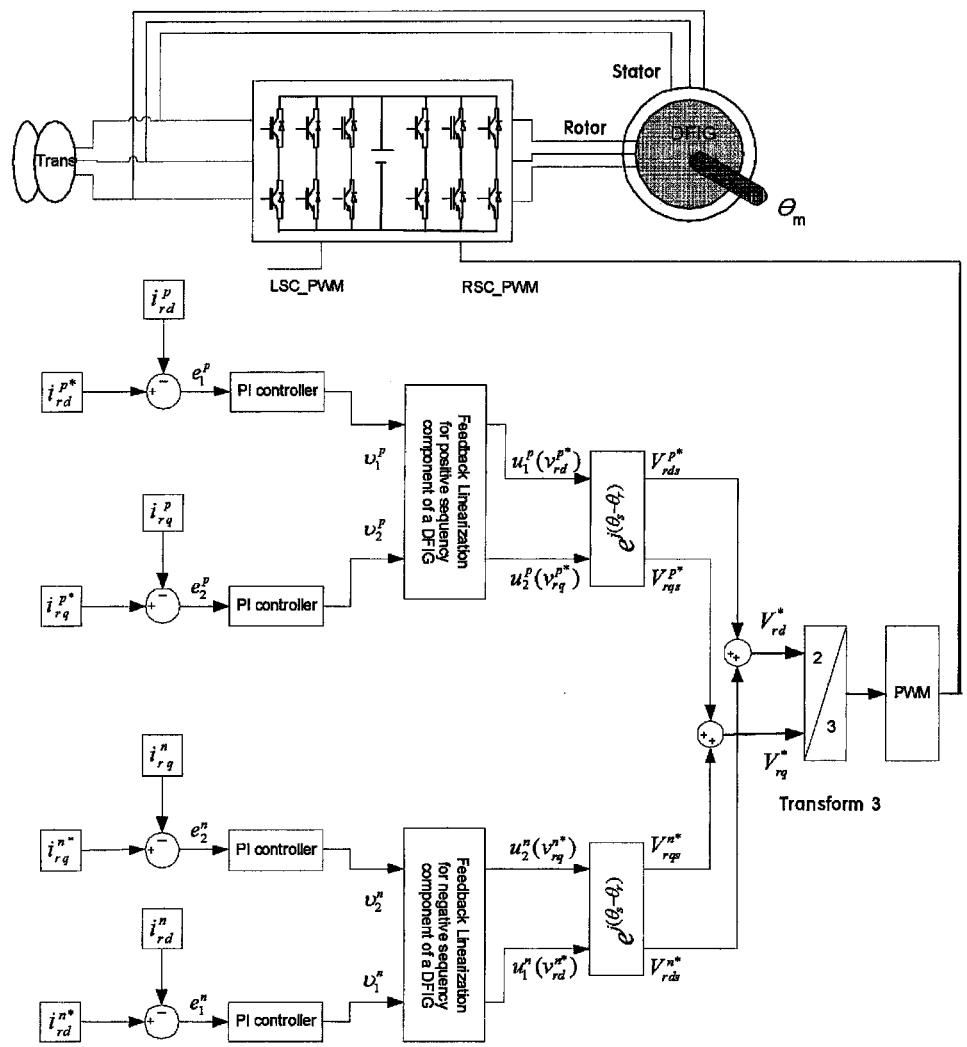
FIG. 15 is a view illustrating the control device connected to the doubly-fed induction generator according to the embodiment of the present invention.

The operational characteristics of the control device for a doubly-fed induction generator according to an embodiment of the present invention were analyzed under unbalanced voltage of a 2.5 MW doubly-fed induction generator. The control device for a doubly-fed induction generator according to the present invention can be connected to a rotor-side converter (RSC) of a doubly-fed induction generator, as illustrated in FIG. 15. The device according to the present invention can be applied to a doubly-fed induction generator additionally equipped with a rotor wire to control slip power and should be provided with an IGBT module having a back-to-back structure having an AC-DC-AC conversion function provided with a method, which is proposed by the present invention, around the rotor wire.

Figure 16:
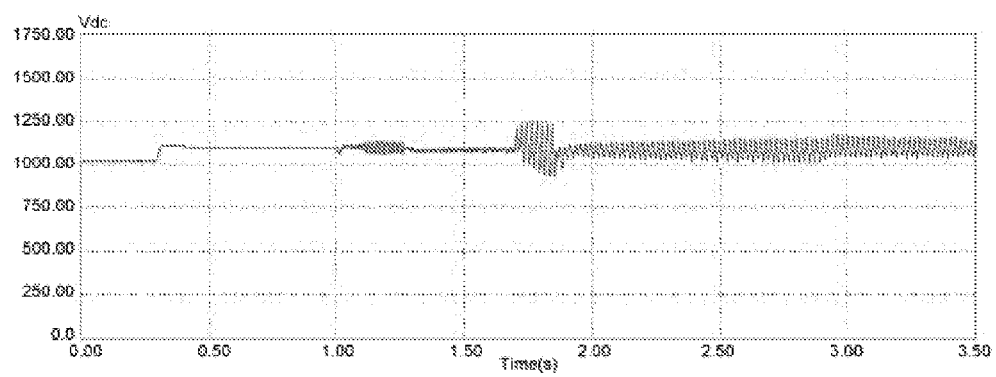
FIG. 16 is a graph illustrating the control characteristics of the control device in the present invention applied to the condition of 50% system voltage drop.
Figure 16:
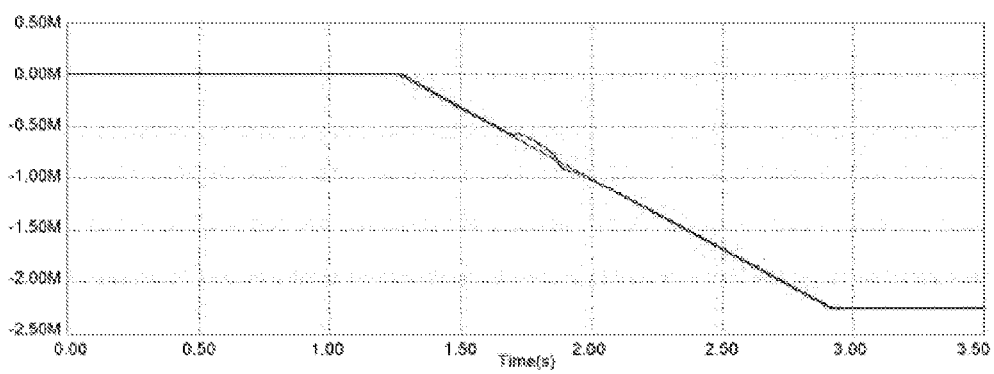
Figure 16:
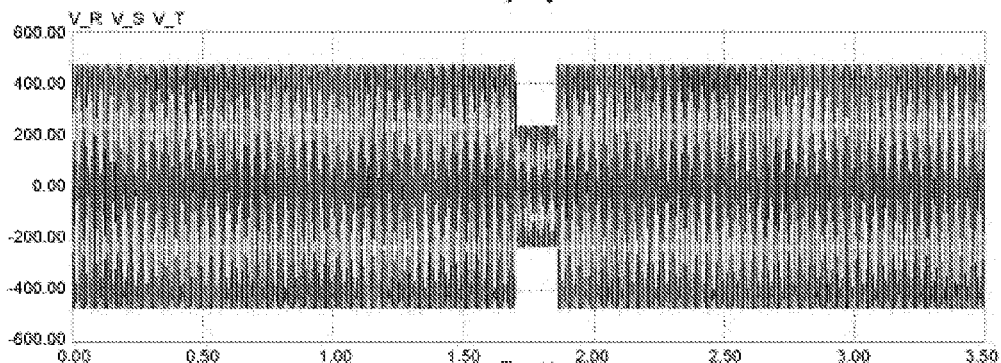

FIG. 16 illustrates the result of performing power control under the system voltage condition (FIG. 16C) in which the system voltage returns after increasing to 50% for 10 cycles, by using the device according to the present invention. FIG. 16A illustrates control characteristics of the DC-link voltage and FIG. 16B illustrates active power control characteristics of the doubly-fed induction generator, under the condition described above.

Figure 5:
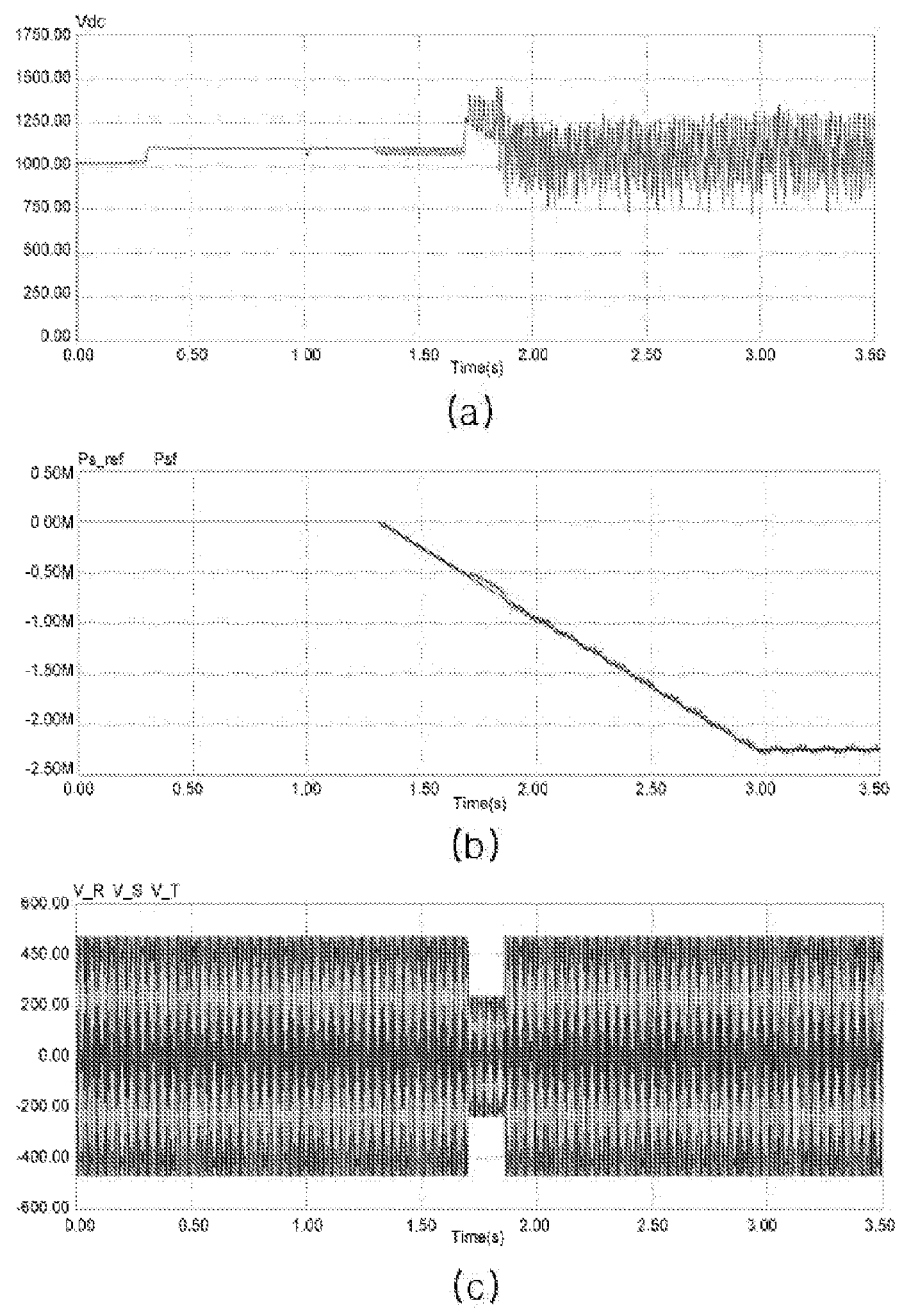
FIG. 5 is a graph illustrating control characteristics of the control device according to the related art under the condition of system voltage drop.

As illustrated in FIG. 16A, the fluctuation band of the DC-link voltage in the voltage drop section was 150V, when the device according to the present invention was applied, which corresponds to 50% of the existing method illustrated in FIG. 5. Further, the fluctuation band was 150V in the section where the voltage was normalized, which was analyzed as illustrated very good characteristics, that is, the fluctuation band was not more than 26% of the fluctuation method (about 575V) of the existing method.

Therefore, it could be seen that it was possible to keep the DC-link voltage relatively stable, even if the system voltage suddenly drops or momentary power failure occurs, by using the control device for a doubly-fed induction generator according to the present invention.

Figure 17:
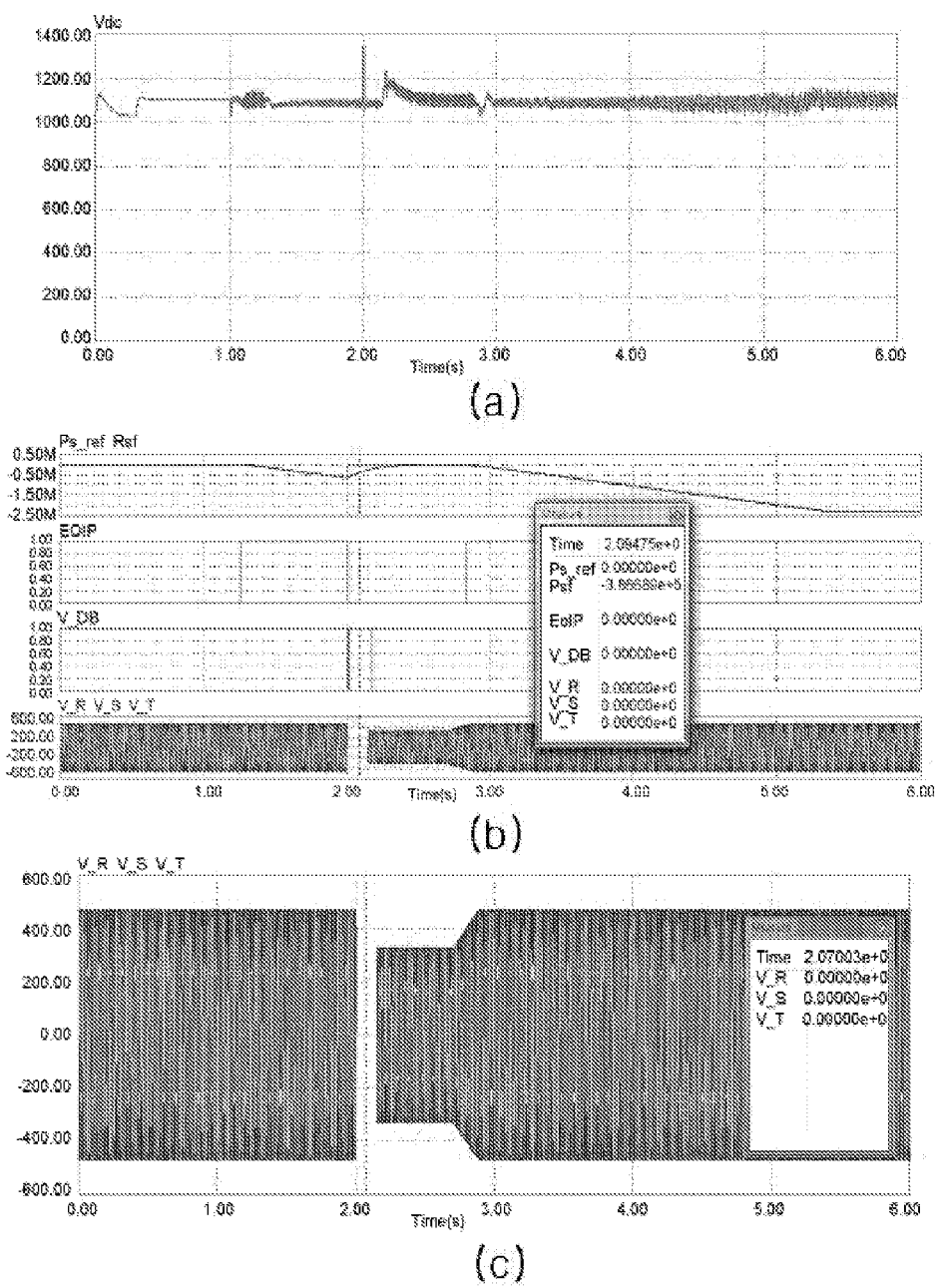
FIG. 17 is a graph illustrating the control characteristics in the case of applying the control device and operation control method according to the embodiment of the present invention to the momentary power failure condition proposed in E.ON Netz.

FIG. 17 illustrates control characteristics according to an experiment under momentary power failure, in the technical standards required by E.ON Netz, when the control device according to an embodiment of the present invention and the sequence control illustrated in FIG. 14 are applied. It could be seen that the DC-link voltage momentarily changes by 230V, but the control characteristics are immediately recovered and the DC-link voltage is recovered to predetermined voltage (FIG. 17A), in a model where power has been cut for 150 ms and recovers to 70%, and maintains at the 70% and then recovers to the normal voltage (see FIG. 17C).

Further, it may be seen that the stator-side switch is turned off again, when the DC-link voltage exceeds the upper limited value DC_Link_VTG_over_limit or the system voltage drops under the stable range Ratio_positive_VTG<0.9, and it can be seen that the stator-side switch is turned on again and power generation continues through the IN_phase process, when the DC-link voltage normalizes and the system voltage correspondingly normalizes.

Figure 18:
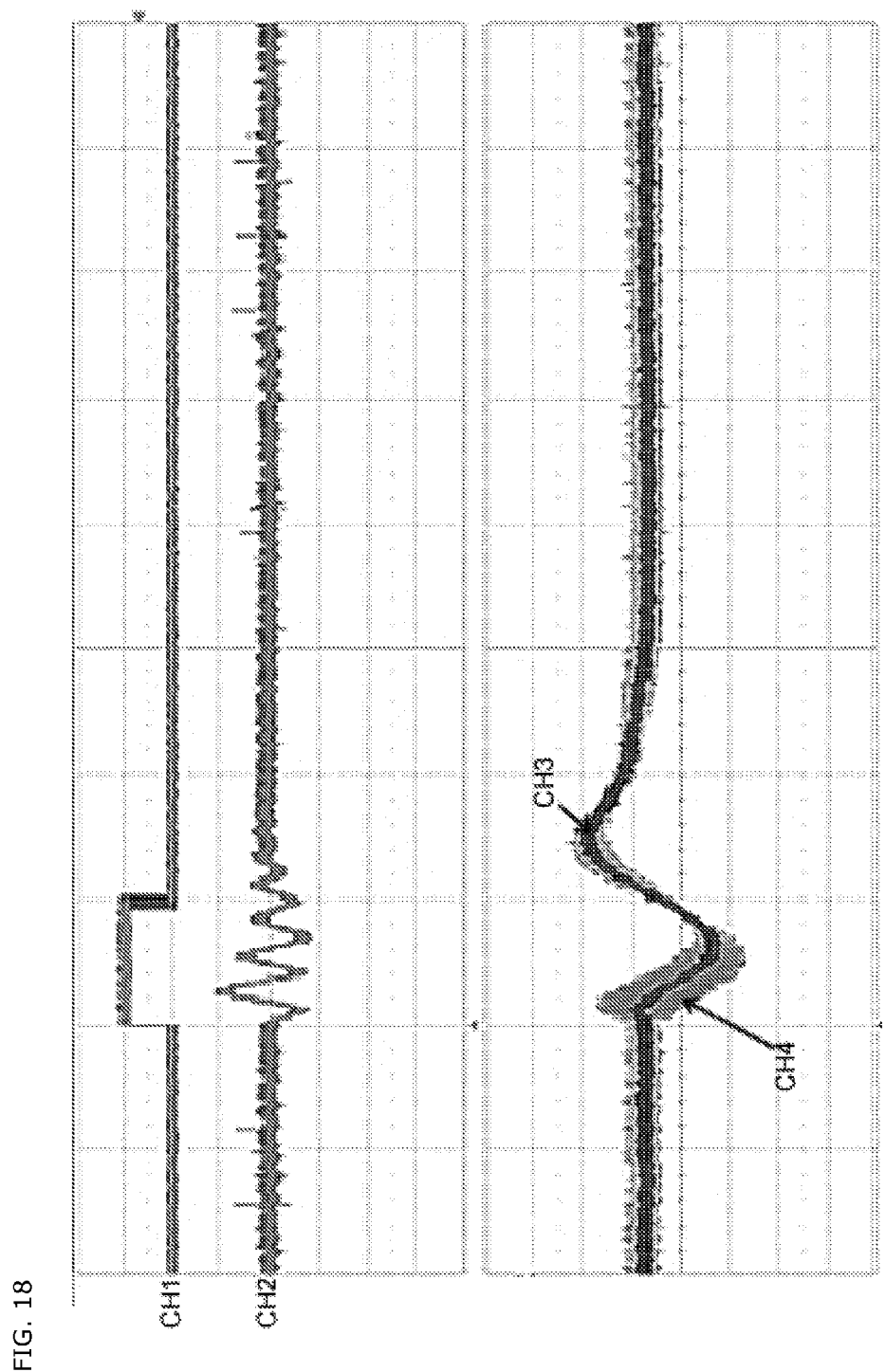
FIG. 18 is a view illustrating active power control characteristics in the section of 30% system voltage drop of the control device according to the embodiment of the present invention.

FIG. 18 illustrates an experimental result when the control device according to the present invention is applied to a control system for a 10 kW doubly-fed induction generator. In detail, a yellow signal ch1 indicates a detection signal for 30% drop of the system voltage, a red signal ch2 indicates DC-link (DC_link) voltage, a green signal ch4 indicates non-filtered active power, and a blue signal ch3 indicates filtered active power.

Figure 4:
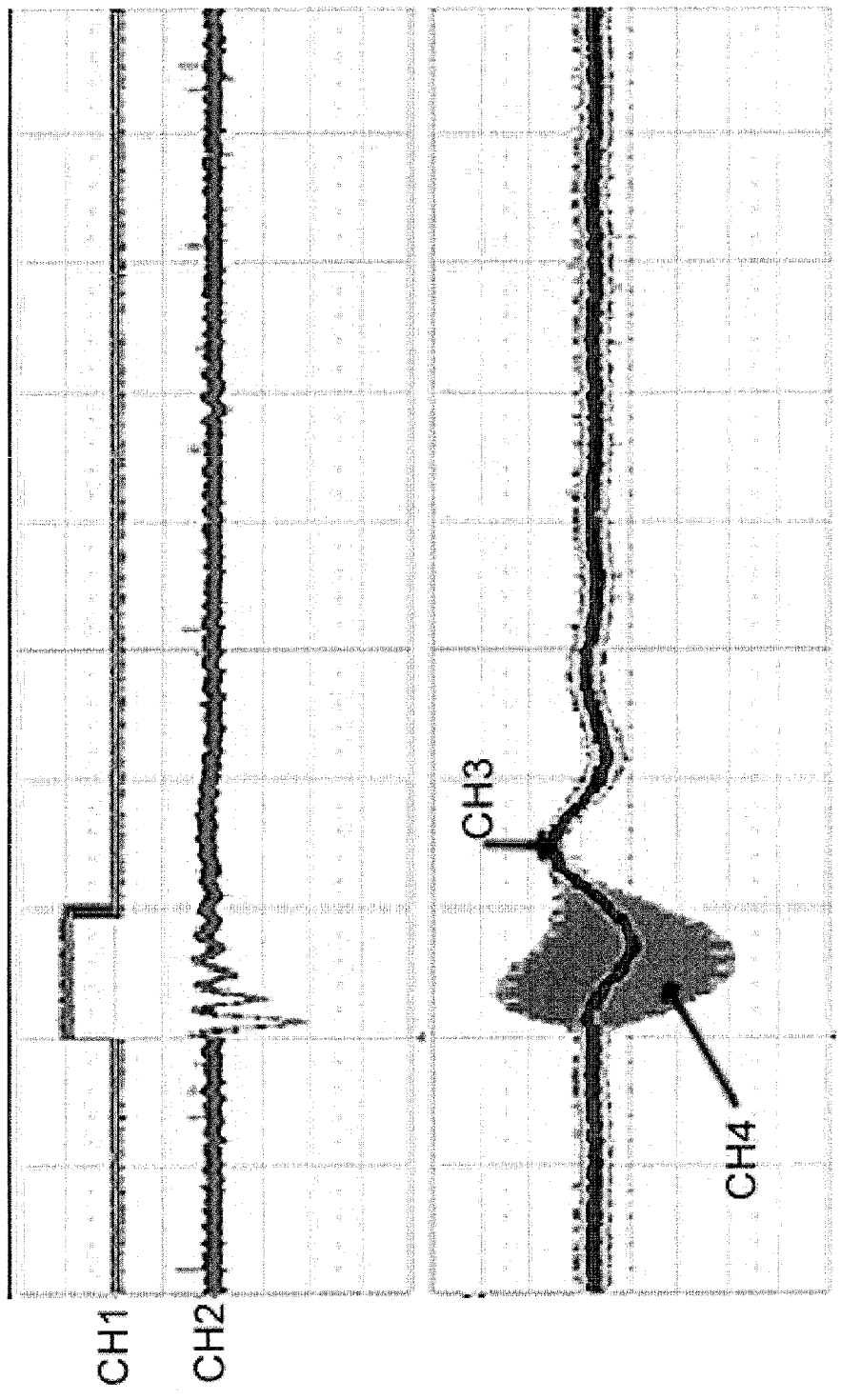
FIG. 4 is a view illustrating active power characteristics in the section of 30% system voltage drop.

As illustrated in FIG. 18, it could be seen that the harmonic component remarkably decreased and the disturbance component considerably reduced, comparing the stator-side active power characteristics Ch4 of the doubly-fed induction generator with when using the control device according to the related art illustrated in FIG. 4 in the section where the voltage drops.

As described above, it can be seen that the control device for a doubly-fed induction generator according to the present invention can stably control the active power and the DC-link voltage and satisfy LVRT specifications, even under unbalanced voltage, such as momentary power failure, as well as under voltage drop.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The invention claimed is:

1. A control device for a doubly-fed induction generator in which a feedback linearization method is embedded, including a current control device for a doubly-fed induction generator controlled by a power conversion device composed of a system-side converter having an AC-DC conversion function and a generator-side converter having a DC-AC conversion function, is characterized in that the control device divides and measures positive sequency components and negative sequency components from stator voltage and current, rotor voltage and current, and signals of stator magnetic flux and rotor magnetic flux of the doubly-fed induction generator, divides the rotor current into four signals by dividing d-axial current and q-axial current from the positive sequency component and the negative sequency component of the rotor current, and makes a positive sequency component controller and a negative sequency component controller for the rotor current separately control the four signals of the rotor current, using the measured value, in which the positive sequency component controller and the negative sequency controller perform current input-output control, which is linearized by a feedback linearization method, for the d-axial current and the q-axial current.

2. A control device for a doubly-fed induction generator in which a feedback linearization method is embedded, including a current control device for a doubly-fed induction generator controlled by a power conversion device composed of a system-side converter having an AC-DC conversion function and a generator-side converter having a DC-AC conversion function, is characterized in that the control device divides and measures positive sequency components and negative sequency components from stator voltage and current, rotor voltage and current, and signals of stator magnetic flux and rotor magnetic flux of the doubly-fed induction generator, divides the rotor current into four signals by dividing d-axial current and q-axial current from the positive sequency component and the negative sequency component of the rotor current, and makes a positive sequency component controller and a negative sequency component controller for the rotor current separately control the four signals of the rotor current, using the measured value, in which the positive sequency component controller performs current input-output control, which is linearized by a feedback linearization method, for the d-axial current and the q-axial current.

3. The control device for a doubly-fed induction generator in which a feedback linearization method is embedded according to claim 1 or 2, wherein d-axial output $v_{rd}^p$ of the positive sequency component controller is calculated as $$v_{rd}^p = \{(R_r i_{rd}^p) - (\omega_s - \omega_r)(\sigma L_r) i_{rq}^p\} + (\sigma L_r) v_1^p$$

Where $R_r$: stator resistance,
$i_{rd}^p$, $i_{rq}^p$: d-axial component, q-axial component for positive sequency component of rotor current,
$\omega_s$, $\omega_r$: stator slip angular velocity, rotor slip angular velocity, $$\sigma = \left(1 - \frac{L_m^2}{L_r L_s}\right)$$

$L_r$: rotor inductance,
$v_1^p$: new state variable 1 of positive sequency component.

4. The control device for a doubly-fed induction generator in which a feedback linearization method is embedded according to claim 1 or 2, wherein q-axial output $v_{rq}^p$ of the positive sequency component controller is calculated as $$v_{rq}^p = \left\{(R_r i_{rq}^p) + (\omega_s - \omega_r)\frac{L_m^2}{L_s}(i_{ms}^p) + (\omega_s - \omega_r)(\sigma L_r) i_{rd}^p\right\} + (\sigma L_r) v_2^p$$

where $i_{ms}^p$: positive sequency component magnetizing current,
$L_s$, $L_m$: stator inductance, mutual inductance,
$v_2^p$: new state variable 2 of positive sequency component.

5. The control device for a doubly-fed induction generator in which a feedback linearization method is embedded according to claim 3,
wherein the new state variable $v_1^p$ is $y_1^* = i_{rd}^{p*}$, and when $y_1 = i_{rd}^p$, it is calculated as $v_1^p = \lambda_{11} e_1^p + \lambda_{12} \int e_1^p dt = \lambda_{11}(y_1^* - y_1) + \lambda_{12} \int (y_1^* - y_1) dt$
where $\lambda_{11}$, $\lambda_{12}$: PI controller constants,
$i_{rd}^p$, $i_{rd}^{p*}$: d-axial rotor current of the positive sequency component, d-axial rotor current reference of positive sequency component, $$e_1^p = y_1^* - y_1.$$

6. The control device for a doubly-fed induction generator in which a feedback linearization method is embedded according to claim 3,
wherein the new state variable $v_1^p$ is $y_1^* = i_{rd}^{p*}$, and when $y_1 = i_{rd}^p$, it is calculated as $v_1^p = \dot{y}_1^* + \lambda_{11} e_1^p + \lambda_{12} \int e_1^p dt = \dot{y}_1^* + \lambda_{11}(y_1^* - y_1) + \lambda_{12} \int (y_1^* - y_1) dt$
where $\dot{y}_1^*$ is the differentiated value of $I_{rd}^{p'}$.

7. The control device for a doubly-fed induction generator in which a feedback linearization method is embedded according to claim 4,
wherein the new state variable $v_2^p$ is $y_2^* = i_{rq}^{p*}$, and when $y_2 = i_{rq}^p$, it is calculated as $v_2^p = \lambda_{21} e_2^p + \lambda_{22} \int e_2^p dt = \lambda_{21}(y_2^* - y_2) + \lambda_{22} \int (y_2^* - y_2) dt$ where $\lambda_{21}$, $\lambda_{22}$: PI controller constants,
$i_{rq}^{p*}$: q-axial rotor current reference of positive sequency component, $$e_2^p = y_2^* - y_2.$$

8. The control device for a doubly-fed induction generator in which a feedback linearization method is embedded according to claim 4, wherein a new state variable $v_2^p$ is $y_2^* = i_{rq}^{p*}$, and when $y_2 = i_{rq}^p$, it is calculated as $v_2^p = \dot{y}_2^* + \lambda_{21} e_2^p + \lambda_{22} \int e_2^p dt = \dot{y}_2^* + \lambda_{21}(y_2^* - y_2) + \lambda_{22} \int (y_2^* - y_2) dt$
where $\dot{y}_2^*$: the differentiated value of $I_{rq}^{p'}$.

9. The control device for a doubly-fed induction generator in which a feedback linearization method is embedded according to claim 1, wherein d-axial output $v_{rd}^n$ of the negative sequency component controller is calculated as $$v_{rd}^n = \{(R_r i_{rd}^n) - (-\omega_s - \omega_r)(\sigma L_r) i_{rq}^n\} + (\sigma L_r) v_1^n$$

where $i_{rd}^n$, $i_{rq}^n$: d-axial component, q-axial component for negative sequency component of the rotor current,
$v_1^n$: new state variable 1 for the negative sequency component.

10. The control device for a doubly-fed induction generator in which a feedback linearization method is embedded according to claim 1, wherein q-axial output $v_{rq}^n$ of the negative sequency component controller is calculated as where $$v_{rq}^n = \left\{(R_r i_{rq}^n) + (-\omega_s - \omega_r)\frac{L_m^2}{L_s}(i_{ms}^n) + (-\omega_s - \omega_r)(\sigma L_r) i_{rd}^n\right\} + (\sigma L_r) v_2^n$$

where
$i_{ms}^n$: negative sequency component magnetizing current,
$v_2^n$: new state variable 2 of negative sequency component.

11. The control device for a doubly-fed induction generator in which a feedback linearization method is embedded according to claim 9, wherein a new state variable $v_1^n$ is $y_1^* = i_{rd}^{n*}$, and where $y_1 = i_{rd}^n$, it is calculated as $v_1^n = \lambda_{11} e_1^n + \lambda_{12} \int e_1^n dt = \lambda_{11}(y_1^* - y_1) + \lambda_{12} \int (y_1^* - y_1) dt$ and $$e_1^n = y_1^* - y_1.$$

12. The control device for a doubly-fed induction generator in which a feedback linearization method is embedded, according to claim 9, wherein new state variable $v_1^n$ is $y_1^* = i_{rd}^{n*}$, and when $y_1 = i_{rd}^n$, it is calculated as $v_1^n = \dot{y}_1^* + \lambda_{11} e_1^n + \lambda_{12} \int e_1^n dt = \dot{y}_1^* + \lambda_{11}(y_1^* - y_1) + \lambda_{12} \int (y_1^* - y_1) dt$.

13. The control device for a doubly-fed induction generator in which a feedback linearization method is embedded according to claim 10, wherein the new state variable $v_2^n$ is $y_2^* = i_{rq}^{n*}$, and when $y_2 = i_{rq}^n$, it is calculated as $v_2^n = \lambda_{21} e_2^n + \lambda_{22} \int e_2^n dt = \lambda_{21}(y_2^* - y_2) + \lambda_{22} \int (y_2^* - y_2) dt$, and $$e_2^n = y_2^* - y_2.$$

14. The control device for a doubly-fed induction generator in which a feedback linearization method is embedded according to claim 10, wherein the new state variable $v_2^n$ is $y_2^* = i_{rq}^{n*}$, and when $y_2 = i_{rq}^n$, it is calculated as $v_2^n = \dot{y}_2^* + \lambda_{21} e_2^n + \lambda_{22} \int e_2^n dt = \dot{y}_2^* + \lambda_{21}(y_2^* - y_2) + \lambda_{22} \int (y_2^* - y_2) dt$.

15. The control device for a doubly-fed induction generator in which a feedback linearization method is embedded according to claim 1, wherein d-axial rotor current reference value ($i_{rd}^{n*}$) and q-axial rotor current reference value ($i_{rq}^{n*}$) of the negative sequency component used in the negative sequency component controller is set as $i_{rd}^{n*} = 0$ and $i_{rq}^{n*} = 0$, respectively.

16. The control device for a doubly-fed induction generator in which a feedback linearization method is embedded according to claim 1 or 2, wherein the control device performs sequence control such that a stator-side main switch is turned on, when the magnitude of the system voltage positive sequency component is more than 90% of the rated voltage of the positive sequency component, and the DC-link voltage is between the upper limit of the DC-link voltage and a lower limit of the DC-link voltage.

17. The control device for a doubly-fed induction generator in which a feedback linearization method is embedded according to claim 16, wherein the control device performs sequence control such that a stator-side main switch is turned off, when the magnitude of the system voltage positive sequency component is less than 90% of the rated voltage of the positive sequency component.

18. The control device for a doubly-fed induction generator in which a feedback linearization method is embedded according to claim 1 or 2, wherein the control device further includes brake resistance devices attached in parallel to both ends of a DC-link voltage and performs the sequence control such that the brake resistance devices are turned on when the DC-link voltage is larger than an upper limit of the DC-link voltage, while the brake resistance devices are turned off when the DC-link voltage is between the upper limit of the DC-link voltage and a lower limit of the DC-link voltage.

19. The control device for a doubly-fed induction generator in which a feedback linearization method is embedded according to claim 1 or 2, wherein the control device performs the sequence control such that the power conversion device stops, when the DC-link voltage is larger than an allowable internal pressure (DC-link voltage stop value) considering capacitors attached in parallel to both ends of the DC-link voltage.

* * * * *